(12) United States Patent
Taher et al.

(10) Patent No.: US 10,917,144 B2
(45) Date of Patent: Feb. 9, 2021

(54) ONE-SHOT WIDEBAND DELAY MEASUREMENT WITH SUB-SAMPLE ACCURACY FOR PARALLEL RECEIVERS AND/OR GENERATORS, AND ALIGNMENT PROCEDURE

(71) Applicant: NATIONAL INSTRUMENTS CORPORATION, Austin, TX (US)

(72) Inventors: Tanim Mohammed Abu Taher, Austin, TX (US); Edward Rodriguez, Austin, TX (US)

(73) Assignee: National Instruments Corporation, Austin, TX (US)

( * ) Notice: Subject to any disclaimer, the term of this patent is extended or adjusted under 35 U.S.C. 154(b) by 159 days.

(21) Appl. No.: 15/918,083

(22) Filed: Mar. 12, 2018

(65) Prior Publication Data

US 2019/0149198 A1    May 16, 2019

Related U.S. Application Data

(60) Provisional application No. 62/586,481, filed on Nov. 15, 2017.

(51) Int. Cl.
| | |
|---|---|
| *H04B 7/0413* | (2017.01) |
| *H04L 5/00* | (2006.01) |
| *H04L 27/26* | (2006.01) |
| *H04J 13/00* | (2011.01) |

(52) U.S. Cl.
CPC ......... *H04B 7/0413* (2013.01); *H04L 5/0048* (2013.01); *H04L 27/2613* (2013.01); *H04L 27/2655* (2013.01); *H04L 27/2662* (2013.01); *H04J 13/0062* (2013.01); *H04L 27/2672* (2013.01); *H04L 27/2675* (2013.01)

(58) Field of Classification Search
CPC .... H04B 7/0413; H04B 7/0417; H04B 17/21; H04J 13/0062; H04L 5/0048; H04L 27/2613; H04L 27/2655; H04L 27/2662; H04L 27/2672; H04L 27/2675; H04L 27/2647

See application file for complete search history.

(56) References Cited

U.S. PATENT DOCUMENTS

| 7,061,254 B1 | 6/2006 | Shoulders | |
|---|---|---|---|
| 9,628,256 B2 | 4/2017 | O'Keeffe | |
| 2004/0052323 A1* | 3/2004 | Zhang | ........... H03L 7/0814 375/375 |

(Continued)

FOREIGN PATENT DOCUMENTS

CN            101682432 B      5/2007

*Primary Examiner* — Khoa Huynh
(74) *Attorney, Agent, or Firm* — Kowert Hood Munyon Rankin and Goetzel PC; Jeffrey C. Hood; Luke S. Langsjoen

(57) ABSTRACT

Systems and methods are described for using a single wideband pilot signal to reduce a timing misalignment between receivers in a multiple-input multiple-output (MIMO) radio system. The multiple generators of the MIMO radio system may be aligned using a second wideband pilot signal subsequent to performing the receiver alignment. The calibration kit of the MIMO radio system may be aligned using a third wideband pilot signal prior to performing the receiver alignment. Alignment may be achieved to subsample precision by determining time delays from the rate of change of the phase shift of the wideband pilot signals.

20 Claims, 17 Drawing Sheets

(56) References Cited

U.S. PATENT DOCUMENTS

| | | |
|---|---|---|
| 2006/0058022 A1 | 3/2006 | Webster |
| 2009/0268787 A1* | 10/2009 | Cairns .................... H04B 1/712 |
| | | 375/148 |
| 2014/0242914 A1 | 8/2014 | Monroe |
| 2015/0215887 A1* | 7/2015 | Nejatian .............. H04B 7/0671 |
| | | 370/350 |
| 2018/0159637 A1 | 6/2018 | Taher |
| 2018/0159640 A1 | 6/2018 | Taher |

* cited by examiner

ONE-SHOT WIDEBAND DELAY MEASUREMENT WITH SUB-SAMPLE ACCURACY FOR PARALLEL RECEIVERS AND/OR GENERATORS, AND ALIGNMENT PROCEDURE

PRIORITY CLAIM

This application claims priority to U.S. provisional patent application Ser. No. 62/586,481, entitled "One-shot Wideband Measurement for Sub-Sample Alignment", filed Nov. 15, 2017, which is hereby incorporated by reference in its entirety as though fully and completely set forth herein.

TECHNICAL FIELD

The present disclosure is related to wireless communications and more particularly to calibrating multiple input multiple output (MIMO) radio systems.

DESCRIPTION OF THE RELATED ART

Wireless radio communications may be significantly affected by the communications environment. In Multiple Input Multiple Output (MIMO) radio systems, there may be undesirable phase misalignment and/or a lack of time synchronicity between the channels. In such cases, it may be desirable to phase align the channels and time synchronize the multiple channels to within a nanosecond or better. It may be further desirable to perform a frequency response correction of the imperfect hardware transmitters and receivers (this is independent of channel frequency response). Each of these processes involve computational complexity, cost, and latency. In some cases, a transmitter may be located remotely from the MIMO radio system, further complicating calibration efforts for communication between the MIMO radio system and the transmitter. As such, improvements in the execution of these processes may be desirable.

SUMMARY

Embodiments described herein relate to systems, storage media, and methods for calibrating a multiple input multiple output (MIMO) radio system using a reference sequence.

Some embodiments relate to a MIMO radio system comprising multiple receivers. Some embodiments relate to a method whereby a wideband pilot signal transmitted to each receiver is used to determine a time delay to subsample precision associated with the transmission of the wideband pilot signal to the respective receiver. The MIMO radio system may employ a programmable delay based on the time delays to reduce a timing misalignment between the plurality of receivers in subsequent communications. Some embodiments relate to further methods to calibrate the system channels and signal generators of the MIMO radio system.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

Figure 1A:
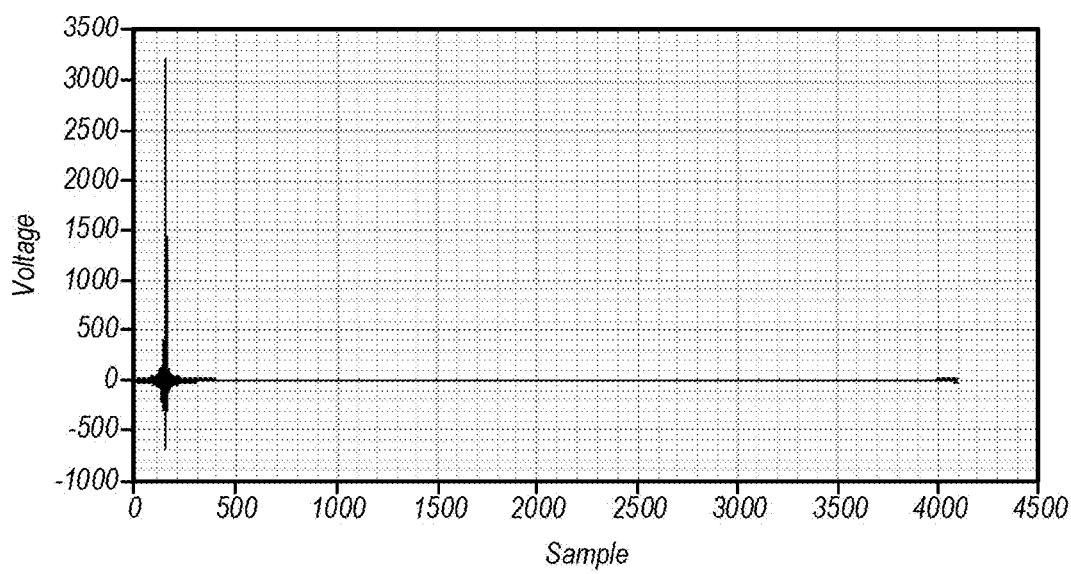
FIGS. 1A-1D illustrate the time domain signal and the frequency domain amplitude of two candidate wideband pilot signals, according to some embodiments.
Figure 1B:
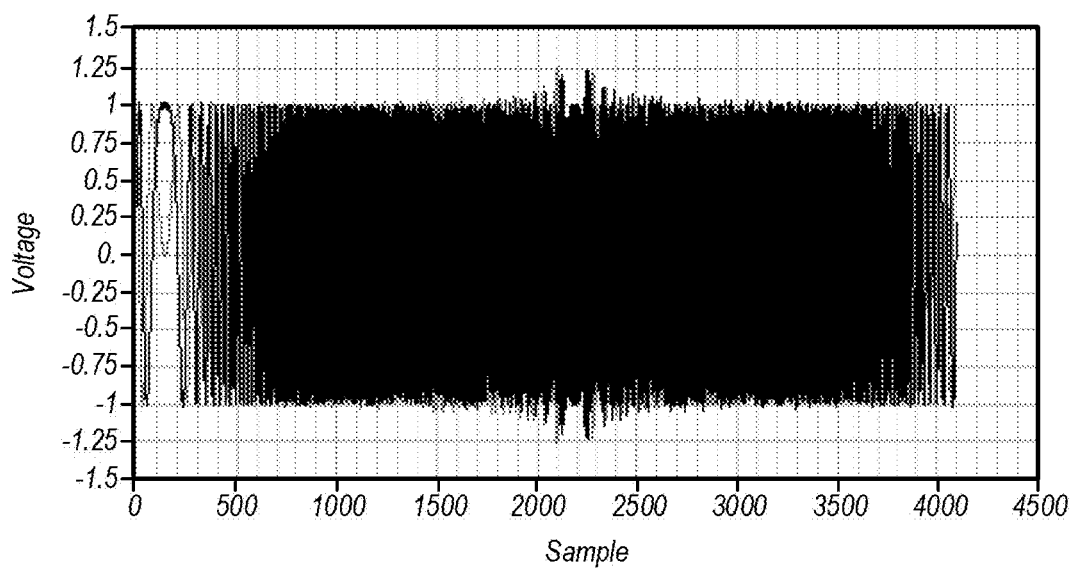
Figure 1C:
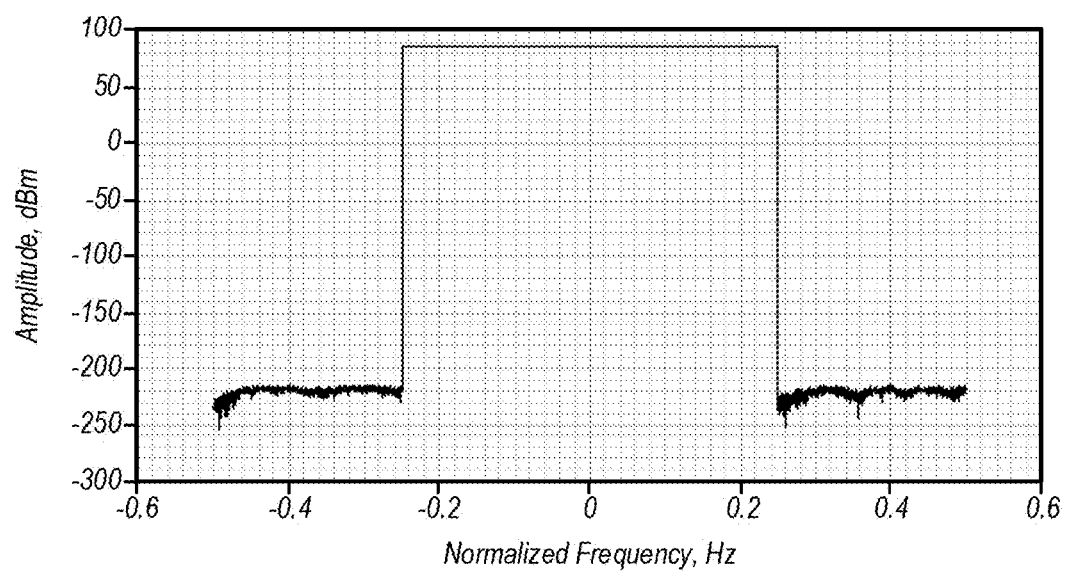
Figure 1D:
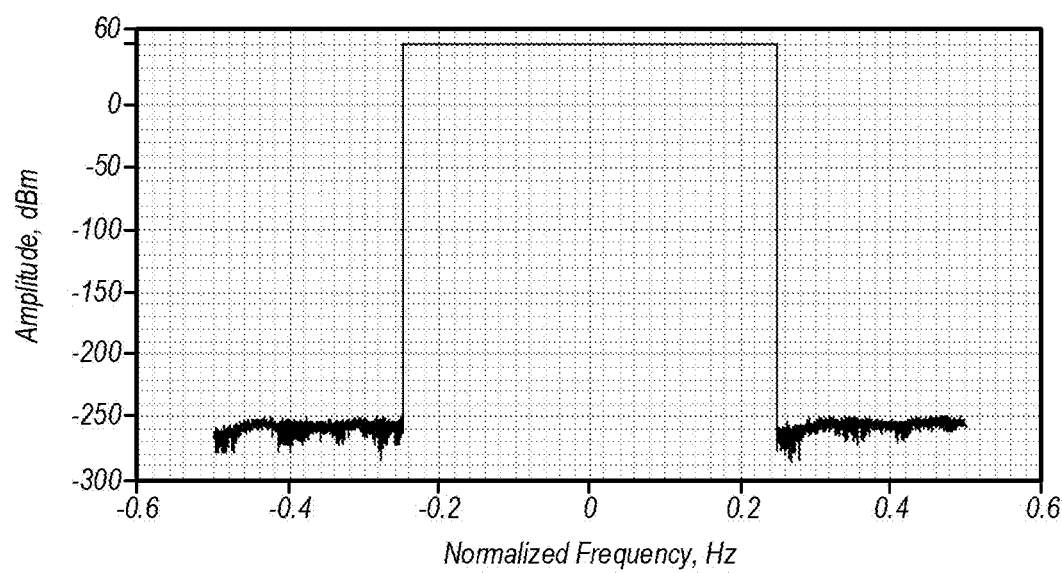

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The use of a multiple-input multiple-output (MIMO) radio device or a MIMO communication system for transmitting and receiving data may be improved if each of the multiple receivers and/or transmitters of the MIMO device are properly calibrated. Embodiments herein describe methods and devices for calibrating a MIMO device by measuring a time-delay in a single calibration signal to sub-sample precision, which may be employed in any of a variety of technological fields and devices. For example, the MIMO device may be a mobile or portable computer system device which performs wireless communications, often referred to as a user equipment device (UE). Examples of UE devices include mobile telephones or smart phones (e.g., iPhone™, Android™-based phones), portable gaming devices (e.g., Nintendo DS™, Play Station Portable™, Gameboy Advance™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Alternatively, in some embodiments, the MIMO radio device may be a measurement apparatus designed to perform channel sounding or other wireless measurements using cellular or another wireless technology. For example, the MIMO radio device may be a cellular measurement device for measuring radio channel conditions for cellular MIMO communications (e.g., 5G or NR communications). Other applications of calibration of MIMO radio devices are also possible, as may be appreciated by one of skill in the art.

Additionally, embodiments described herein may be used in single-input single-output (SISO) devices. For example, the sub-sample measurement of time delay may be used to determine the distance between a transmitter and a receiver in a radar application.

Sub-Sample Time Alignment

In Multiple Input Multiple Output (MIMO) radio systems, it may be desirable to precisely time synchronize the multiple channels, e.g., within tens of picoseconds or better. Time synchronization may be improved if the misalignment between the parallel receivers is precisely measured prior to synchronization. After synchronization, it may be further determined how much tight synchronization was achieved and what is the residual misalignment.

Wireless applications wherein a precise measurement of the flight time is desirable (for example, channel sounding and radio environment measurement systems) typically employ digital samplers that measure the flight time to a resolution that is equal to the digital sampling interval. A drawback of this approach is that for very precise measurement of the flight time, very high digital sampling rates may be required that put constraints and added expense to the hardware. Additionally, wide spectral bandwidth licenses may need to be obtained for the transmission and reception of the probing wireless signal. Embodiments described herein greatly alleviate these issues by performing measurements with a slow digital sampling rate, wherein the flight time is measured to a fractional sub-sample of the sampling interval. This may reduce hardware cost and the spectral bandwidth requirements.

In some embodiments, a wide-band complex pilot signal is routed to one receiver directly, or to multiple parallel N receivers using a 1:N splitter. The receivers may digitize the received pilot signal, and then in each receiver, a frequency domain comparison may be made between the complex phases of the received signal and the known ideal wideband pilot signal. Mathematically, a time delay corresponds to a linear frequency dependent phase shift in the frequency domain for any signal (e.g., since a given time delay will correspond to a larger phase shift for a higher frequency). Thus, by measuring the phase shift versus frequency between the received and pilot's frequency domain phases, the time delay in each receive path may be precisely calculated, where the time delay resolution is in sub-samples of the digital sampling interval.

Embodiments herein offer several advantages over existing implementations for MIMO time alignment. The timing delay differences between the MIMO paths may be precisely compared, and hence the misalignment may be measured prior to synchronization. Post synchronization, the residual misalignment between channels may be measured. Additionally, embodiments herein determine a precise measurement of the flight time, since the flight time may be calculated to sub-sample resolution and is not restricted to integer multiples of the sampling interval. Embodiments herein may operate in any digital radio SISO or MIMO receiver without substantial modification or addition of hardware components within the radios themselves, although external RF components like a splitter may be desirable (e.g., for the MIMO case).

The measured misalignment between the parallel receivers may be removed by using programmable delays or programmable equalizers with a delay function. By applying the measured sub-sample offsets in parallel receivers and correcting for those, very tight picosecond alignment of parallel receivers may be achieved.

Embodiments herein may be applicable in aligning parallel generators tightly to picoseconds. First, parallel receivers may be tightly aligned by first measuring the full+sub-sample offsets in their sampling times, and then correcting for this misalignment by using programmable delays. Subsequently, parallel generators may be connected to the previously aligned parallel receiver system, such that the output of each generator is connected to a receive channel. The generators may then transmit the same wideband signal when simultaneously triggered by a common signal. The parallel receiver system may measure the sub-sample offsets in generation time between each of the generator channels down to picoseconds. With these measured values, the generators may be tightly aligned to picoseconds by using a programmable delay or programmable equalizer with a delay function in each generator path, that applies an opposite correction delay to remove the misalignment for that channel. By removing the misalignments in generation time in each channel, all the generators may become tightly synchronized to each other.

Embodiments herein have been tested in the NI VST™ and NI mmWave Transceiver™ hardware. However, embodiments described herein may be applied in other NI hardware including legacy NI single or multi-channel digitizers that do not employ Tclk™ and which have slower sampling rates, as well as other various types of non-NI hardware. Despite the lack of Tclk™ and slow sampling rates in legacy NI instruments, measurement of sub-sample delay and signal propagation time may still be achieved to a great deal of precision. Advantageously, this may be accomplished without internal modifications to legacy NI modules.

In some embodiments, a known wideband signal is sent from a transmitter (e.g., a signal generator) to a single receiver or parallel receivers. In the parallel receiver case (for example, a MIMO communication system), the receivers may be triggered to capture the received signals simultaneously, and may optionally share a single local oscillator (LO) between them. In each receiver, a Fast Fourier Transform (FFT) may be applied to the wideband received signal. The phase information of the FFT of this signal may be subtracted from the phase of the FFT of the ideal known wideband signal, and a graph of phase shift versus digitized frequency bin may be obtained. This graph may be equivalently obtained by multiplying the FFT of the received signal with the complex conjugate of the FFT of the ideal wideband signal. An analog time delay in the time domain may correspond to a measurable linear phase shift versus frequency in the digitized frequency domain of a signal. Using this principle, and equations (1) and (2) below, the time delay of signal propagation from the transmit side to the receive side may be calculated at each frequency bin of the FFT.

It may be appreciated that the total phase shift $\Delta\theta_k$ at the $k^{th}$ frequency bin is a summation of 2 terms: the linearly dependent phase shift across the frequency bins caused by the time delay, and a constant offset caused due to a phase shift, $\varphi$, of the wideband signal that is fixed and common across all the frequency bins. $\Delta\theta_k$ may represented by Equation (1):

$$\Delta\theta_k = -\frac{2\pi k \cdot \delta_k}{N} + \varphi \quad (1)$$

Here $\delta_k$ is the whole+fractional sample time delay, k is the FFT frequency bin, $\Delta\theta_k$ is the total phase shift between the FFT of received and ideal wideband signal, $\varphi$ is the constant phase shift across the frequency band, and N is the FFT length.

If a series of points are plotted for $\Delta\theta_k$ across frequency bins that fall within the passband of the channel, the fixed phase shift $\varphi$ may be calculated as the point where the straight line, approximated from the plot of the points or derived via a least squares method, crosses the vertical y-axis. Once this fixed phase offset is calculated from the plot, Equation (2) may be used to plot an estimate of the whole+fractional sample delay $\delta_k$, at those frequency bins that lie within the passband of the channel.

$$\delta_k = -\Delta\theta \cdot \frac{N}{2\pi k} + \varphi \cdot \frac{N}{2\pi k} \quad (2)$$

To obtain an accurate estimate of the whole+fractional sample time delay, D, statistical methods may be used such as a simple mean using all the estimated $\delta_k$ at the frequency bins within the passband. The time delay in seconds may be obtained by dividing the sample+sub-sample delay term D by the sampling frequency $f_s$. At high sampling rates, the time delay may be obtained with picosecond resolution. In the MIMO case, by repeating the same process across all receivers, the signal propagation delay may be measured from transmitter to each receiver. Advantageously, the delay may be calculated to within tiny fractions of the receiver analog-to-digital converter (ADC) sampling duration. Hence, embodiments herein that employ a wideband method can measure the multi-sample+sub-sample propagation delay between transmitter and receiver for single or multiple channels. In the multiple parallel receiver case, the sampling times' misalignment between multiple parallel receivers may be obtained simply by calculating the differences between the propagation delays of all the receivers.

FIGS. 1A-1D—Two Candidate Waveforms for Pilot Wideband Signals

FIGS. 1A-1D illustrate the time domain signal and the frequency domain amplitude of two candidate wideband pilot signals—a sync impulse, and a Zadoff-Chu sequence. As shown, the desirable flat frequency response is obtained of the wideband signal selected for use.

A variety of wideband signals may be used as the pilot signal, in addition to the examples shown in FIGS. 1A-1D. For example, any of a time-domain impulse, Zadoff-Chu sequences, modified Zadoff-Chu sequences, or a frequency chirped wideband signal may be used, as well as a wide variety of other types of wideband signals. Zadoff-Chu (ZC) sequences are complex-valued mathematical sequences, which, when applied to radio signals, result in a signal with constant amplitude. Further, cyclically shifted versions of a ZC sequence imposed on a signal result in zero correlation with each other at the receiver because cyclically shifted versions of a ZC sequence are orthogonal. ZC sequences are a special type of Constant Amplitude Zero Autocorrelation (CAZAC) sequence. CAZAC sequences are complex-valued periodic sequences with cyclically shifted autocorrelation equal to zero and constant amplitude. Although ZC sequences are discussed herein to facilitate illustration, any of various appropriate CAZAC sequences or other sequences may be used in other embodiments instead of or in addition to ZC sequences. Additionally, embodiments herein are not limited to wideband signals, as other signal types may also be used. However, implementation may be facilitated if the amplitude response of the wideband signal is relatively flat over the frequency bins where Equations (1), (2) are applied. This may facilitate in a practical system that the signal to noise ratio (SNR) at each frequency bin where Equations (1, 2) are applied is relatively the same; and so, the statistical estimate D may be more accurate.

Figure 2:
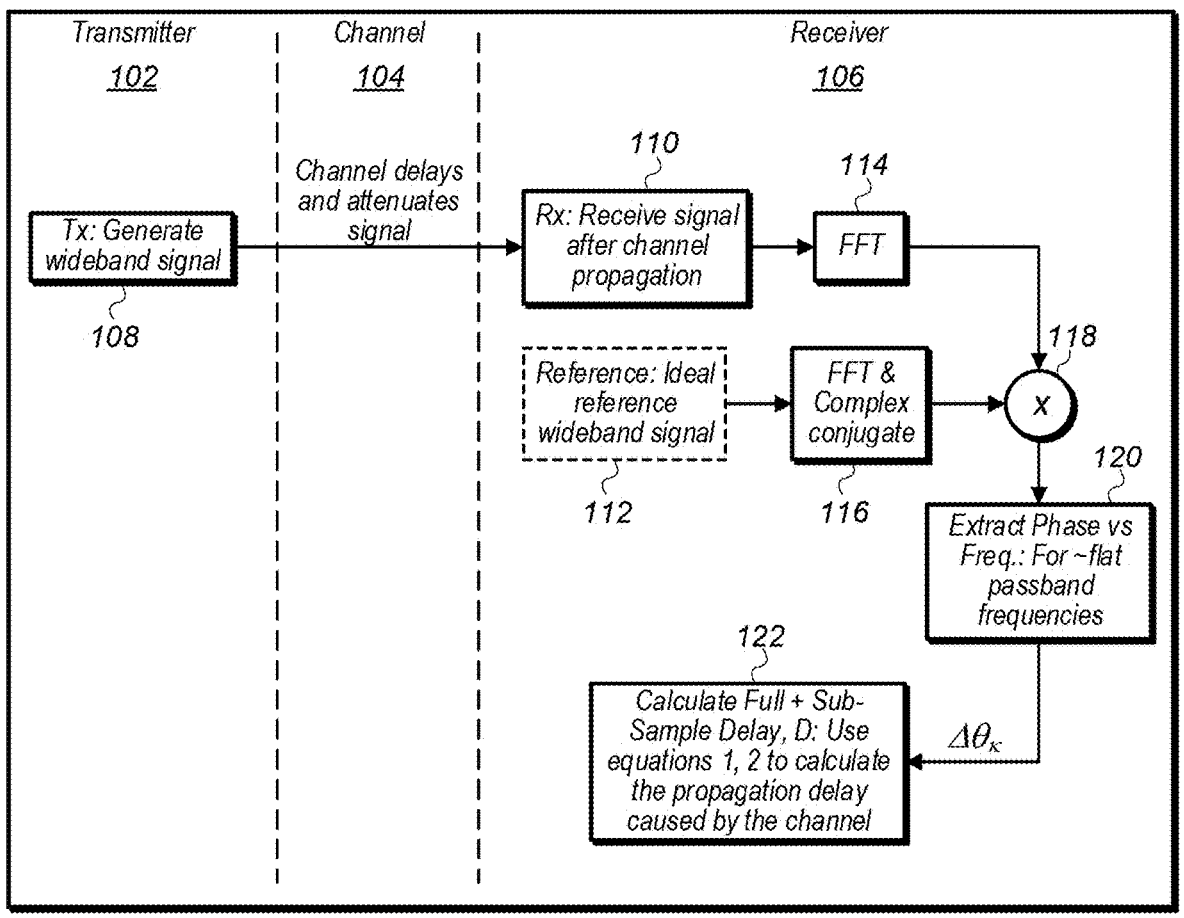
FIG. 2 is a block diagram illustrating an algorithm to implement subsample delay measurements for a single receiver, according to some embodiments.

FIG. 2—Block Diagram of Algorithm for a Single Receiver

FIG. 2 is a system level diagram of signal generation and processing blocks to implement subsample delay measurements in a single receiver, according to some embodiments. In the multiple receiver case (e.g., MIMO), the receiver blocks operate in parallel in each $i^{th}$ receive signal processing chain to obtain the propagation delay D for each channel. This may be repeated in parallel for measuring the sub-sample delay in each of the parallel receivers in the multiple channel case.

Figure 3:
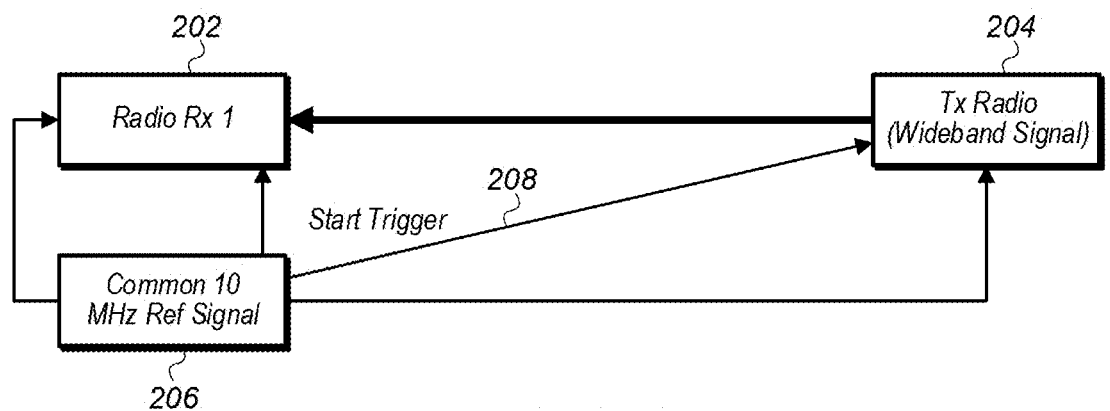
FIG. 3 illustrates a single receiver configuration with a wired signal source, according to some embodiments.
Figure 4:
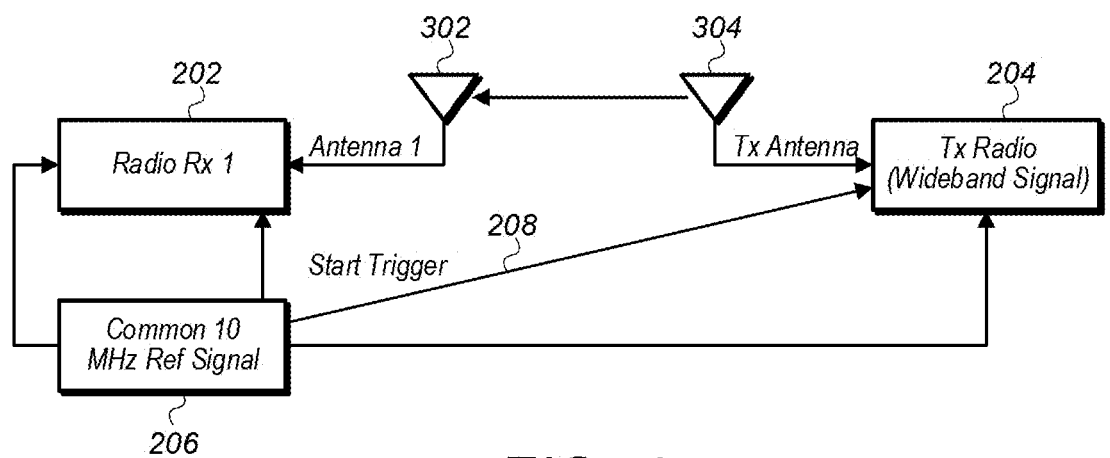
FIG. 4 illustrates a single receiver configuration with a wireless signal source, according to some embodiments.

FIGS. 3-4—Single Receiver Sub-Sample Delay Measurement with a Wired and Over-the-Air Signal Source FIG. 3 shows a wired configuration for a single receiver, where the setup measures the propagation delay between the single transmitter and the receiver over that wire, according to some embodiments. FIG. 4 illustrates a variation of this setup, wherein over-the-air (OTA) flight time of the signal is measured from the transmit antenna to the receive antenna.

Figure 5:
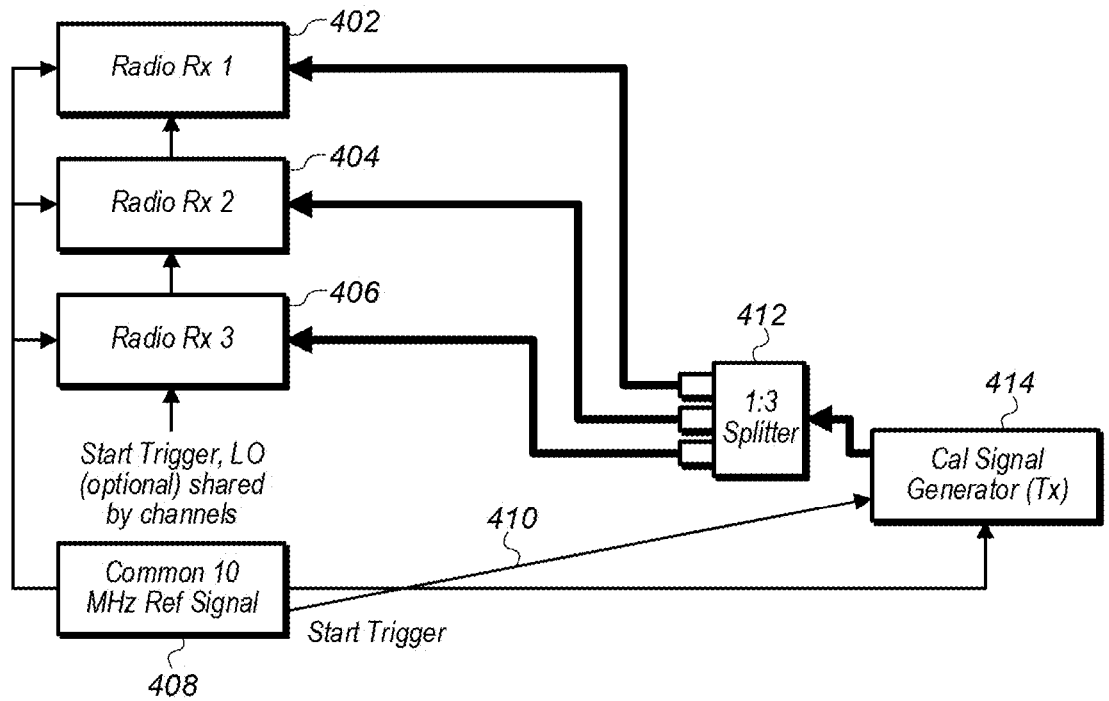
FIG. 5 illustrates a multiple receiver configuration with a wired signal source, according to some embodiments.
Figure 6:
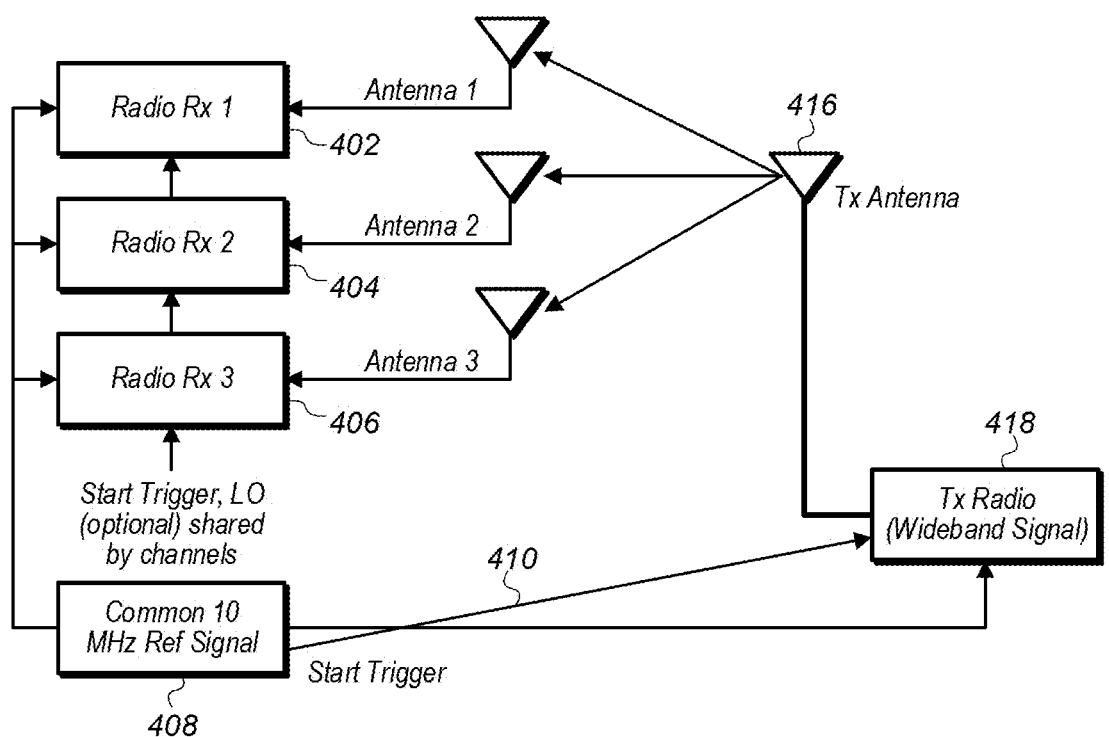
FIG. 6 illustrates a multiple receiver configuration with a wireless signal source, according to some embodiments.

FIGS. 5-6—Parallel Receiver for Sub-Sample Delay Measurement with a Wired and Over-the-Air Signal Source FIG. 5 shows a configuration where the signal from one transmitter is split and received via cables by 3 parallel receivers in a MIMO communication system, according to some embodiments. FIG. 5 shows 3 radios, but the methods and systems described herein can more generally support N MIMO channels for any N>1. Methods described herein are used to measure the full+sub-sample delays in each cabled path. FIG. 6 shows a variation of this configuration where a single antenna broadcasts the wideband signal, according to other embodiments. Each of the 3 receivers may run an algorithm to measure the OTA flight times in each of the 3 OTA paths.

As illustrated in FIGS. 5 and 6, in some embodiments a common 10 MHz reference source 408 may be used for the various radios. The 10 MHz common reference signal 408 ensures that the digital-to-analog converter (DAC) of the signal generator 414 (e.g., in FIG. 5) or the Tx Radio 418 (e.g., in FIG. 6), and the receivers' digitizer analog-to-digital converters (ADCs) 402-406, are locked with respect to the reference and to each other. With the 10 MHz clocks locked, the time alignment in the digitized ADC samples will hold for a long duration after applying timing alignment calibration methods described herein.

Sharing the 10 MHz references also means that the frequencies of the receivers 402-406 are very close and locked to each other. A further enhancement to this method may involve daisy chaining the Local Oscillators (LOs) that do the down conversion to ensure that the phase alignments also hold for a long duration after the disclosed method for alignment is complete. This may be accomplished for embodiments wherein the radios are configured to share LOs. In these embodiments, (optionally) sharing a single LO between radio receivers may enable the MIMO communication system to remain aligned for an extended duration of time relative to embodiments wherein the radio receivers do not share LOs. In embodiments where the radios are not configured to share LOs, the calibration method may be repeated more frequently to realign the phases, although the timing alignment may still hold for a long time in these embodiments.

Figure 7:
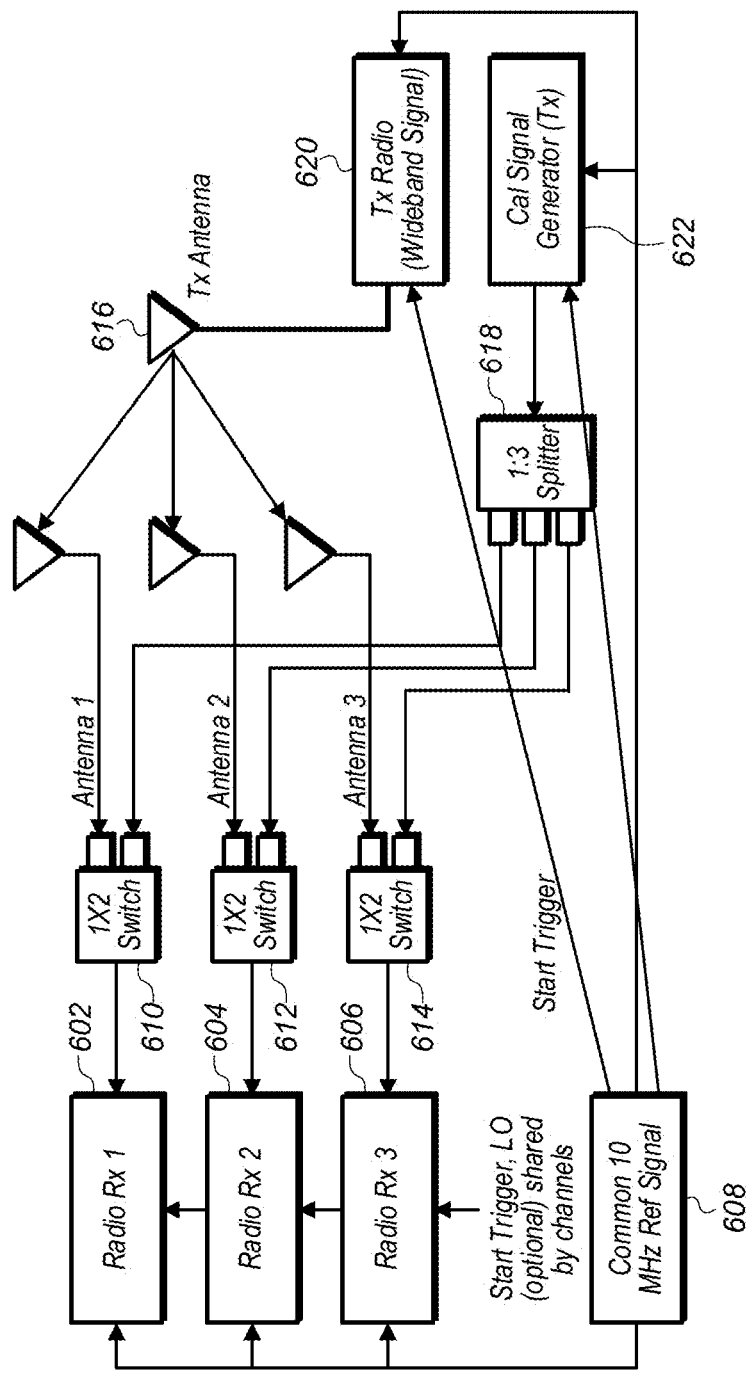
FIG. 7 illustrates a multiple receiver configuration with both a wired and wireless connection to the signal generator, according to some embodiments.

FIG. 7—Method to Measure Delays in Flight Time Using a Local Path Signal Generator FIG. 7 combines the configurations of FIGS. 5 and 6 in an embodiment that improves the OTA flight time estimates for the signal propagation times between the transmit (Tx) Antenna to 3 parallel receive antennas. In the configuration illustrated in FIG. 5, the sampling instances of the digitizers in receivers 1, 2 and 3 may not be tightly aligned. In the illustrated embodiment of FIG. 7, a calibration signal generator generates the wideband signal and sends it to the parallel receivers through a splitter followed by identical length cables, followed by identical switches, and then again identical length cables. Through the identical length electrical paths, the sub-sample delays in each path may be measured and compared. From this calibration path configuration, the sub-sample delays should be identical in all the 3 paths. However, in practice, they are not identical (e.g., due to digitizer misalignment). However, embodiments herein may measure the digitizer misalignment by subtracting the sub-sample delay from receiver 1, with receivers 1, 2 and 3; such that the misalignment between receivers may be precisely measured. Then, the 3 switches may be changed to the antenna elements for OTA flight time measurement, where identical cables and antennas are used for each path. The flight times may be measured in the OTA paths in the same way as in FIG. 6 (this measurement includes errors due to the digitizers' misalignment). The measured misalignments from the previous calibration path may be subtracted from these imprecise measured flight times to get more accurate OTA flight times from the Tx antenna to every receive antenna. This decouples the digitizer misalignment error from the actual OTA measurements, thus improving accuracy.

Figure 8:
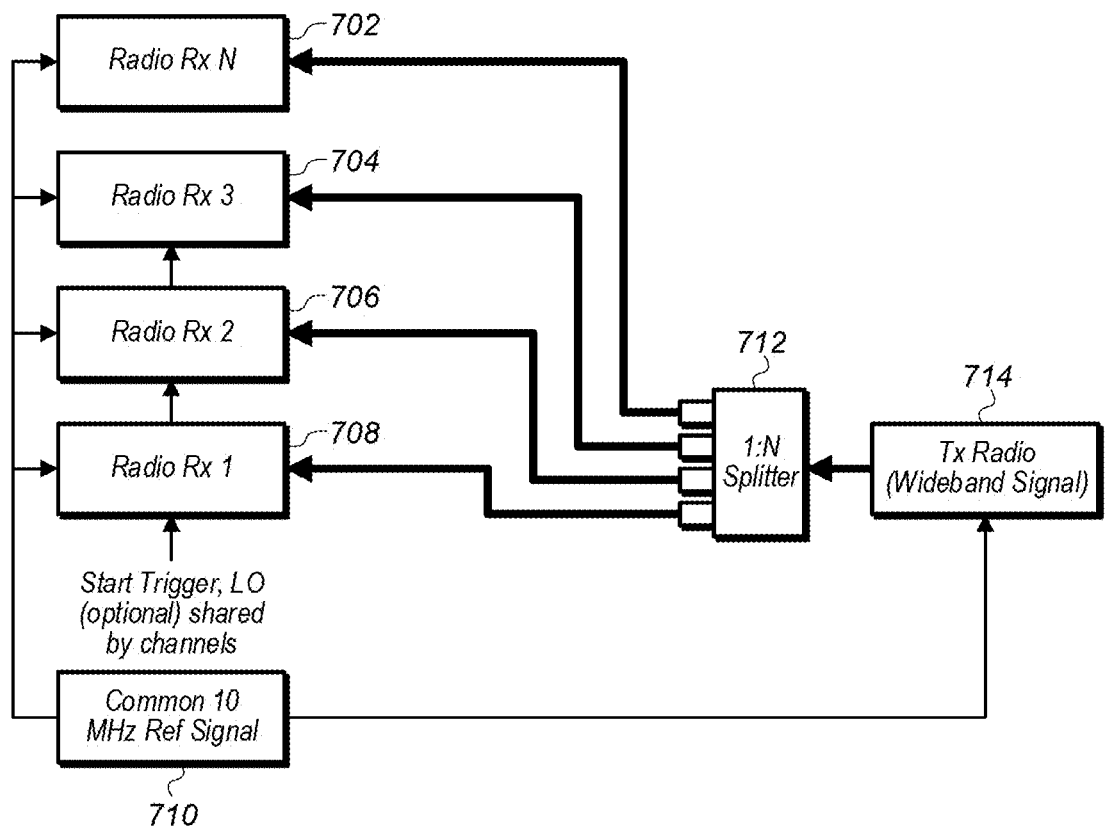
FIG. 8 illustrates a setup wherein a wideband waveform may be sent to a plurality of receivers, according to some embodiments.

FIG. 8—Alignment Setup for Multiple Parallel Receivers

In some embodiments, the methods illustrated in FIGS. 5 and 7 may be generalized in a Multi-Channel RF Phase Aligned vector signal analysis system. For example, FIG. 8 illustrates a setup wherein a wideband waveform may be sent to a plurality of receivers. Using techniques described herein, the sampling delay may be precisely measured in all the receivers and then the effective delay differences may be removed using features provided by the vector signal analyzers. These features may be implemented using both a programmable delay block or a customizable equalization filter that includes a delay function. Additionally, the information contained in the wideband waveform may be used to simultaneously measure the frequency-dependent characteristics of the individual receivers and similarly remove the channel-to-channel differences. In these embodiments, a multichannel time-aligned vector signal analysis system is produced, where all the channels have been externally calibrated to match their responses at external RF ports.

In the channel sounder case, equalizers may be derived that tightly time align the parallel sounding receivers. The residual misalignment in each channel after the multi-channel timing synchronization may then be measured by using the full+sub-sample propagation delay method described herein. As illustrated below, this may result in accuracy of the delay measurement on the order of hundreds of femto-seconds to several pico-seconds.

Figure 9:
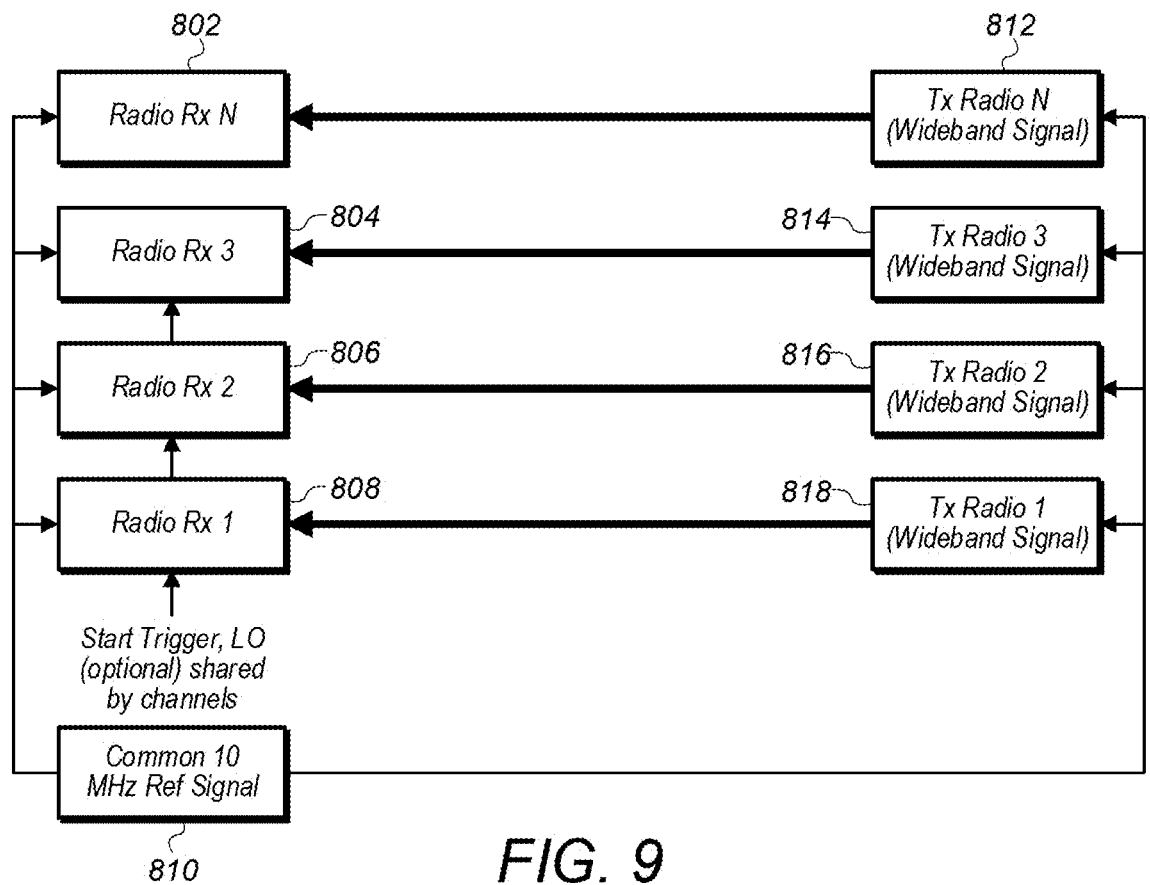
FIG. 9 illustrates a setup wherein multiple parallel generators are configured to transmit a wideband waveform to multiple respective parallel receivers, according to some embodiments.

FIG. 9—Alignment Setup for Parallel Generators Using a Pre-Aligned System of Parallel Receivers FIG. 9 extends the system described by FIG. 8, to also create a Multi-Channel RF Time-Aligned vector signal generation system, according to some embodiments. By first creating the analyzer system, the calibrated input channels may be used to also calibrate an equal number of generation channels following a similar process. In these embodiments, the generation channels may output the same wideband calibration signal simultaneously, and the measurement technique described above may be used to measure both the fine channel-channel delay, and frequency dependent characteristics of each generator. Because the generators are connected directly to a calibrated input system, the measured differences may be identified as resulting from the generation system. The programmable delay and equalization features available in the vector signal generators may then be used to remove the differences between the generators and achieve a generation system that has also been calibrated to the external RF ports.

Figure 10:
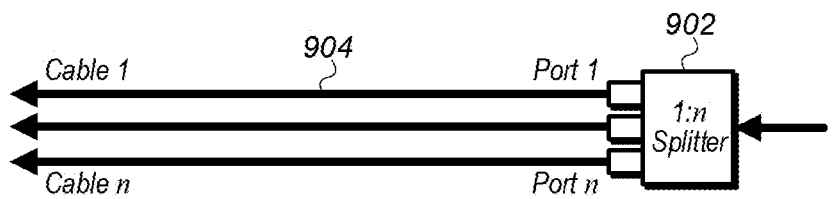
FIG. 10 illustrates typical components of a calibration kit (calkit), according to some embodiments.

FIG. 10—Calibration Kit (Cal-kit)—Splitter/Combiner and Cables

FIG. 10 illustrates the typical components included with a "calibration kit", or cal-kit, which may be used according to embodiments described herein. As illustrated, the cal-kit may include a 1:n splitter with n ports, with a cable connected from each splitter/combiner port to a receive port. The splitter may function as either a splitter or combiner, depending on the particular configuration. For example, it may function as a splitter when a signal is transmitted according to the direction of the arrows in FIG. 10 (i.e., right to left). However, the splitter may alternatively function as a combiner if the flow of information proceeded from left to right. The complete communication path from the input of the cal-kit to the output at a particular receive port may be considered a channel of the cal-kit.

The misalignment measuring algorithms and synchronization algorithms described above assume that the signal propagation time for the cal-kit is the same across all channels of the cal-kit, and all misalignments are caused by the receivers. However, in reality, there may be small path differences (e.g., several picoseconds) between the cal-kit channels. Differences in the paths internal to the splitter, and slight differences in cable lengths may contribute to misalignment and affect the pico-second accuracy of the synchronization algorithms.

Figure 11:
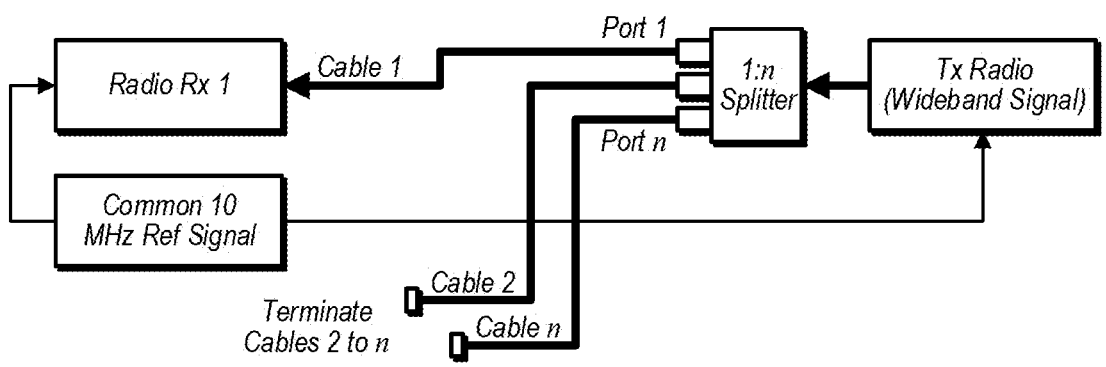
FIG. 11 illustrates a setup for calibrating the system channels of the calibration kit, according to some embodiments.

FIG. 11—Measuring Delta Propagation Delays of Cal-Kit Ports to De-Embed Inaccuracies Introduced by Cal-Kit FIG. 11 illustrates a method for calibrating the separate channels of the cal-kit. As illustrated, the local oscillator (LO), 10 MHz timing reference, and generation and acquisition start triggers are shared in common between a single generator-receiver combination. As such, the measured phases and timing in this Tx-Rx combination may be mostly constant in every triggered acquisition since the triggers, LO and 10 MHz reference are all common. The setup illustrated in FIG. 11 may be used to calibrate out the propagation differences in the cal-kit itself, prior to using that cal-kit for aligning multiple channels. In FIG. 11, the cable 1 and port 1 of the splitter are connected to the receiver (Radio RX 1), and the propagation delay, $D_{Calkit1}$, may be measured to picosecond accuracy using the whole+sub-sample delay measurements described above. When measuring $D_{Calkit1}$, the cables 2 to n for cal-kit ports 2 to n may be terminated.

Subsequently, cable 1 may be disconnected from the receiver and terminated, and Cable 2 and port 2 of the splitter may be connected to the receiver. Then, the propagation delay in this second cal-kit port may be measured as $D_{Calkit2}$. This process may be repeated for all cal-kit ports 1 to n. Finally, the delay $D_{Calkit1}$ may be subtracted from all subsequent $D_{Calkit,n}$ measurements such that the change in propagation delay in each port of the cal-kit is calculated as: $\Delta D_{Calkit,i} = D_{Calkit,n} = D_{Calkit1}$.

During a subsequent multi-channel misalignment measurement procedure, the cal-kit port deltas may be added to get improved and more accurate measurements. For example, this effectively de-embeds the cal-kit path differences from subsequent MIMO transmissions.

Figure 12:
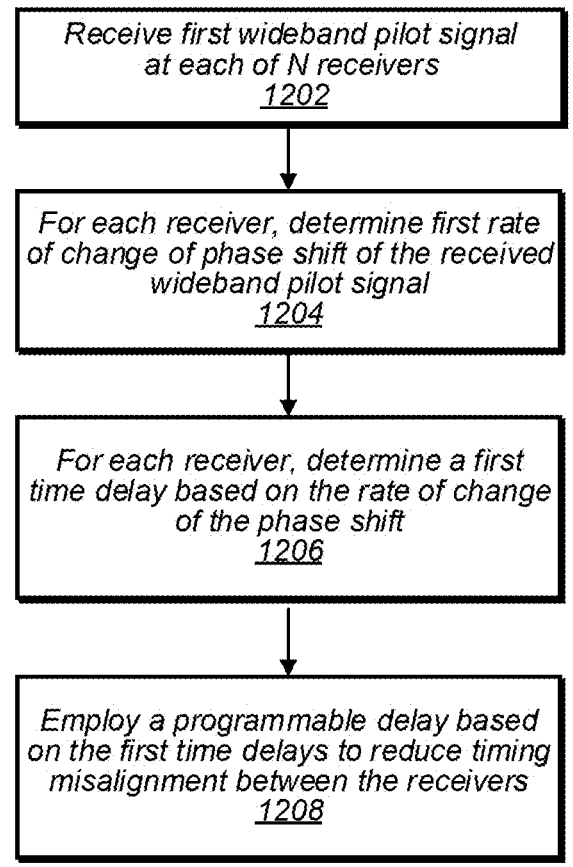
FIG. 12 is a flow chart diagram illustrating a method for performing receiver alignment, according to some embodiments.

FIG. 12—Method for Receiver Alignment

FIG. 12 is a flow chart illustrating a method for performing sub-sample time alignment of receivers in a MIMO communication system, according to some embodiments. The methods described in FIG. 12 may be performed, for example, by the MIMO systems illustrated in any of FIGS. 5-9, among other possibilities. The described embodiments may be implemented by a MIMO radio system comprising a plurality of receivers and generators coupled to one or more processing elements. Alternatively, in some embodiments, a non-transitory computer-readable memory medium may comprise program instructions executable by a processor to implement the method steps described.

At 1202, each of the plurality of receivers may receive a first wideband pilot signal from a signal generator through a respective system channel. In some embodiments, as described above, each of the plurality of receivers may share a local oscillator (LO). In some embodiments, the first wideband pilot signal may comprise at least one of a time-domain sync impulse, a Zadoff-Chu sequence, a multi-sine signal, and/or a frequency chirped wideband signal. Other types of wideband pilot signals, or more broadly other types of pilot signals, may also be used.

At 1204, a first rate of change of a phase shift as a function of frequency of the received first wideband pilot signal may be determined for each of the plurality of receivers. In some embodiments, in determining the rate of change of the phase shift, a fast Fourier transform (FFT) may be applied to the first wideband pilot signal to obtain a first FFT signal. The FFT may also be applied to a reference wideband pilot signal to obtain a reference FFT signal. Phase information of the first FFT signal may be subtracted from phase information of the reference FFT signal to obtain phase shift information, and the rate of change of the phase shift may be determined based on the phase shift information.

In some embodiments, the rate of change of the phase shift is determined further based on averaging over phase shift information associated with a plurality of different frequency bins of the FFT. For example, a rate of change of the phase shift may be calculated multiple times for adjacent frequency bins of the FFT, and an overall rate of change of the phase shift may be determined by averaging over the individually calculated rates of change.

In some embodiments, in determining the rate of change of the phase shift based on the phase shift information, a least squares regression linear fit is applied to the phase shift information across the FFT frequency bins to obtain the first rate of change, and the application of the least squares regression linear fit may also determine a phase offset at 0 Hz between local oscillators of the signal generator and receivers.

In some embodiments, a frequency selective method may be used to determine the frequency bins with the best signal-to-noise ratio (SNR) and signal quality for use in the estimation of the first rate of change. For example, phase shift information from frequency bins with better SNRs and/or signal quality may be preferentially used, or may be weighted more heavily, in determining the first rate of change.

At 1206, for each of the plurality of receivers, a first time delay for reception of the first wideband pilot signal may be determined based on the first rate of change. For example, as described above, a time delay for reception of a signal may introduce a phase shift that varies linearly with the magnitude of the time delay. In some embodiments, the first time delays may be determined to sub-sample precision.

At 1208, a programmable delay may be employed based on the first time delays to reduce a timing misalignment between the plurality of receivers. For example, the programmable delay may delay reception by different ones of the plurality of receivers, such that differences between the first time delays between different receivers are reduced. The aligned MIMO radio system may then be used in subsequent communications using the programmable delay, so that the receivers are more tightly aligned.

Figure 13:
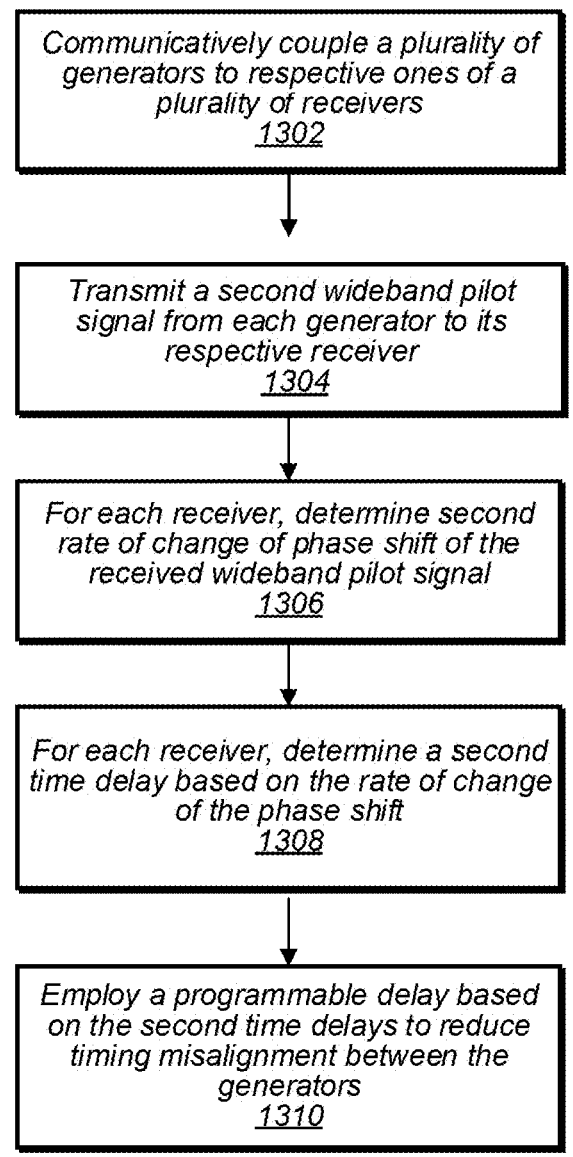
FIG. 13 is a flow chart diagram illustrating a method for performing generator alignment, according to some embodiments.

FIG. 13—Method for Generator Alignment

FIG. 13 is a flow chart illustrating a method for performing sub-sample time alignment of generators in a MIMO communication system, according to some embodiments. The methods described in FIG. 13 may be performed subsequent to employing a programmable delay to align the receivers of the MIMO communication system. For example, the steps in FIG. 13 may occur subsequent to completion of the steps illustrated in FIG. 12. The methods described in FIG. 13 may be implemented by a MIMO radio system similar to that illustrated in FIG. 9, for example. The described embodiments may be implemented by a MIMO radio system comprising a plurality of receivers and generators coupled to one or more processing elements.

At 1302, a plurality of generators may be communicatively coupled to respective ones of a plurality of receivers of the MIMO communication system. The generators may be coupled to respective receivers using either of a wired or a wireless connection. The intervening hardware between each receiver and generator may be referred to herein as a "system channel".

At 1304, each of the plurality of generators may transmit a second wideband pilot signal to its respective receiver. For example, the second wideband pilot signal may be a separate wideband pilot signal from the first wideband pilot used to calibrate the receivers in connection with FIG. 12. The second wideband pilot signal may be of a similar type as the first wideband pilot signal. For example, the second wideband pilot signal may comprise at least one of a time-domain sync impulse, a Zadoff-Chu sequence, a multi-sine signal, and/or a frequency chirped wideband signal.

At 1306, a second rate of change of a phase shift as a function of frequency of the received second wideband pilot signals may be determined for each of the plurality of receivers. The second rate of change may be determined in a manner similar to that described at step 1204 of FIG. 12, for example. It may be understood that the rate of change of the phase shift is here referred to as "second" to distinguish it from the first rate of a phase shift determined at step 1204 of FIG. 12.

At 1308, a second time delay for reception of the second wideband pilot signal may be determined based on the second rate of change. The second time delay may be determined based on the second rate of change in a manner similar to that described at step 1206 of FIG. 12, for example. The second time delay may be determined to subsample precision.

At 1310, a programmable delay in each generator (e.g., the programmable delay determined in the steps described in FIG. 12) may be adjusted based on the second time delays to reduce a timing misalignment between the plurality of generators. For example, while the method described in reference to FIG. 12 may reduce a timing misalignment between the different receivers, the method described here in reference to FIG. 13 may further reduce a timing misalignment between the different generators, thus increasing the alignment precision of the MIMO radio system. The methods described herein with regard to FIGS. 12 and 13 may further be performed subsequent to performing calibration kit alignment, as described below in reference to FIG. 14.

Figure 14:
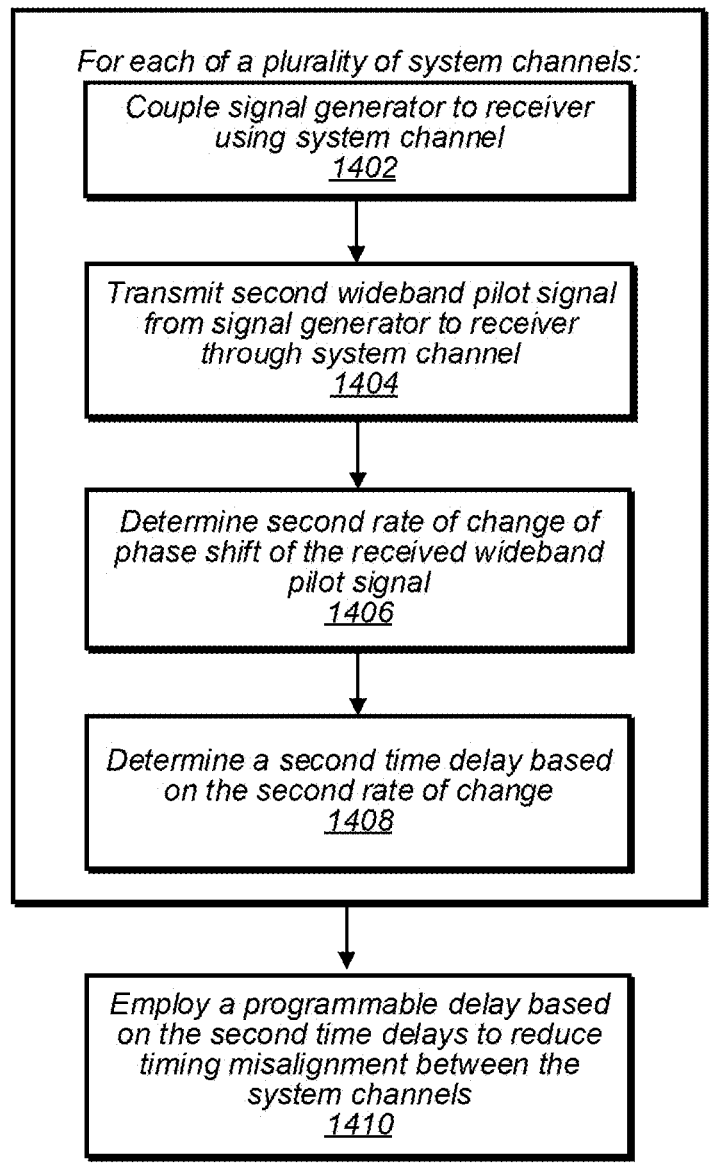
FIG. 14 is a flow chart diagram illustrating a method for performing calibration kit alignment, according to some embodiments.

FIG. 14—Method for Calibration-Kit Alignment

FIG. 14 is a flow chart illustrating a method for performing sub-sample time alignment of the calibration kit (calkit) system channels in a MIMO communication system, according to some embodiments. The calibration kit system channels may include on or more of the physical components that connect the signal generator or generators to the multiple receivers of the MIMO system. For example, the calkit system channels may comprise the cables and ports that connect the 1:n splitter (for MIMO systems comprising a single generator) or the multiple generators (in MIMO systems with multiple generators) to the receivers. The methods described in FIG. 14 may be performed prior to employing a programmable delay to align the receivers of the MIMO communication system. For example, the steps in FIG. 14 may occur prior to completion of the steps illustrated in FIG. 12. The methods described in FIG. 14 may be performed using a MIMO system similar to that illustrated in FIGS. 10-11, for example. The described embodiments may be implemented by a MIMO radio system comprising a plurality of receivers and generators coupled to one or more processing elements.

The following steps 1402-1408 may be separately performed for each of the system channels. For example, each of 1402-1408 may be subsequently performed for each of the system channels of the calibration kit, as illustrated in FIG. 11.

At 1402, the system channel may be used to connect the signal generator to a first receiver of the plurality of receivers.

At 1404, a second wideband pilot signal (i.e., a separate wideband pilot signal from the first wideband pilot used to calibrate the receivers in connection with FIG. 12) may be transmitted from the signal generator to the first receiver through the respective system channel. The second wideband pilot signal may be of a similar type as the first wideband pilot signal. For example, the second wideband pilot signal may comprise at least one of a time-domain sync impulse, a Zadoff-Chu sequence, a multi-sine signal, and/or a frequency chirped wideband signal.

At 1406, a second rate of change of a phase shift as a function of frequency of the transmitted second wideband pilot signal may be determined. The second rate of change may be determined in a manner similar to that described at step 1204 of FIG. 12, for example. It may be understood that the rate of change of the phase shift is here referred to as "second" to distinguish it from the first rate of a phase shift determined at step 1204 of FIG. 12.

At 1408, a second time delay associated with the respective system channel may be determined based on the second rate of change. The second time delay may be determined based on the second rate of change in a manner similar to that described at step 1206 of FIG. 12, for example. The second time delay may be determined to subsample precision.

At 1410, a timing misalignment in a subsequent MIMO communication session using the system channels may be reduced based on the second time delays. In some embodiments, reception of the first wideband pilot signal by each of the plurality of receivers (e.g., in connection with calibrating the receivers as described in FIG. 12) may employ a programmable delay based on the second time delays to reduce a timing misalignment caused by differences between the system channels. For example, timing misalignment between the different system channels may be reduced prior to attempting to reduce receiver misalignment and/or generator misalignment using the methods described in reference to FIGS. 12 and 13.

In some embodiments, each of the system channels may comprise a switch that is usable to switch the respective system channel between a wired connection and a wireless connection. In these embodiments, calibrating the system channels may be performed while the system channels are switched to the wired connection.

Figure 15:
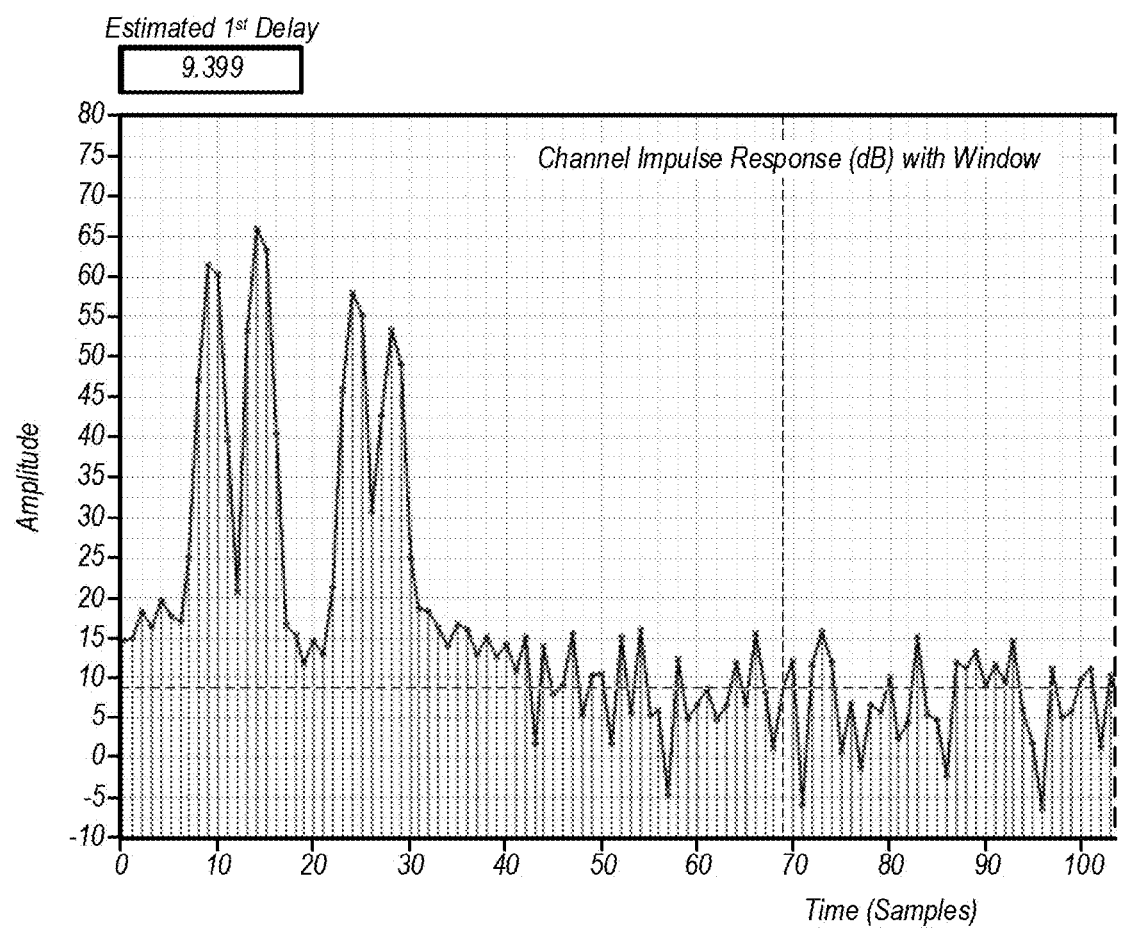
FIG. 15 illustrates data for simulated delays caused by a four tap filter channel, according to some embodiments.

FIG. 15—Simulated Delays Using 4 Tap Filter Channel

FIG. 15 is a screenshot that shows simulated delays caused by a 4 tap filter channel, and the measured sub-sample delays according to embodiments described herein.

In the simulation, multiple impulses, where each impulse was delayed by a different sample+sub-sample fractional digital offset, were transmitted in a simulated AWGN channel. The simulated receiver then used a peak detection algorithm to extract the time-domain samples corresponding to each impulse. As is known by those of skill in the art, an impulse in the time domain corresponds to a wideband flat amplitude and linear phase signal in the frequency domain. A method according to embodiments herein was then applied to calculate the phase delta between an ideal impulse and the received impulse to calculate its sample+sub-sample fractional offset and compared to the original delays that were applied in the transmit side of the simulation. The calculated values matched with the original delays, indicating a successful delay calculation.

In another hardware based implementation with parallel receivers, a single Zadoff Chu signal was transmitted and was received by each channel in a similar configuration to FIGS. 5 and 7. The algorithm calculated the sub-sample misalignment between each receiver with pico-second accuracy. When a multi-channel timing alignment procedure was applied to tightly align these receivers, the algorithm was validated since it measured the residual misalignment down to femtoseconds; whereas pre-alignment, the delays between the multiple receivers were in the nanosecond range as measured with this algorithm.

The NI mmWave Transceiver System was the hardware platform in this particular implementation, and the symbol duration used in this experiment was 1.302 ns. However, measurements were made with pico-second accuracy; i.e., the sub-sampling accuracy of this method has been demonstrated to a one one-thousandth fraction of the sampling duration.

An implementation of this method was also made with a different wideband signal—a frequency chirped signal—on the NI Vector Signal Transceiver. Measurement accuracy of 1 picosecond was achieved and validated using this hardware.

Figure 16:
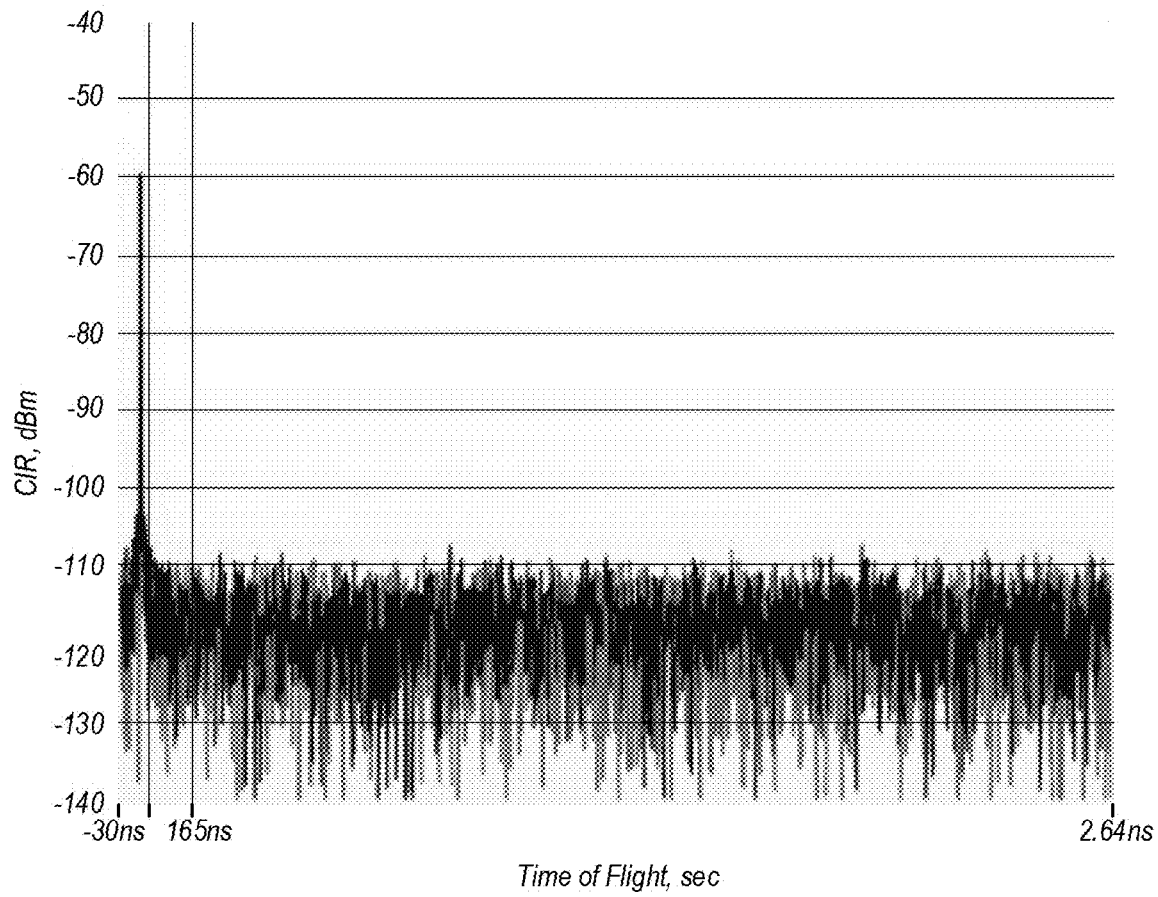
FIG. 16 illustrates measurements of sub-sample delays on system comprising four parallel receivers, according to some embodiments.
Figure 17A:
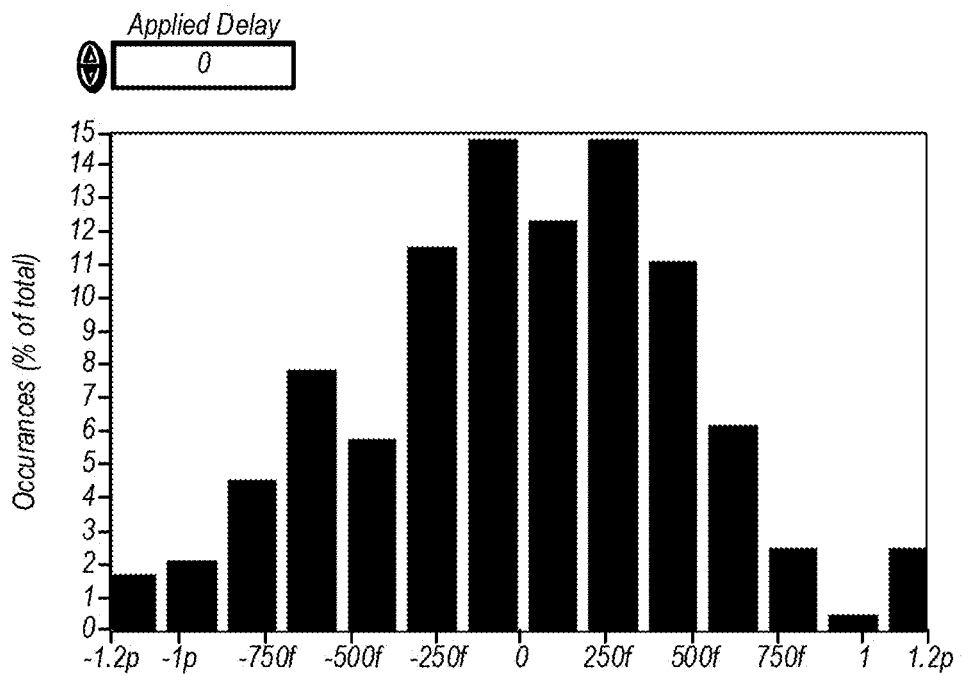
FIGS. 17 A-F illustrate implementation results measuring sub-sample offset delays in parallel vector signal transceivers, according to some embodiments.
Figure 17B:
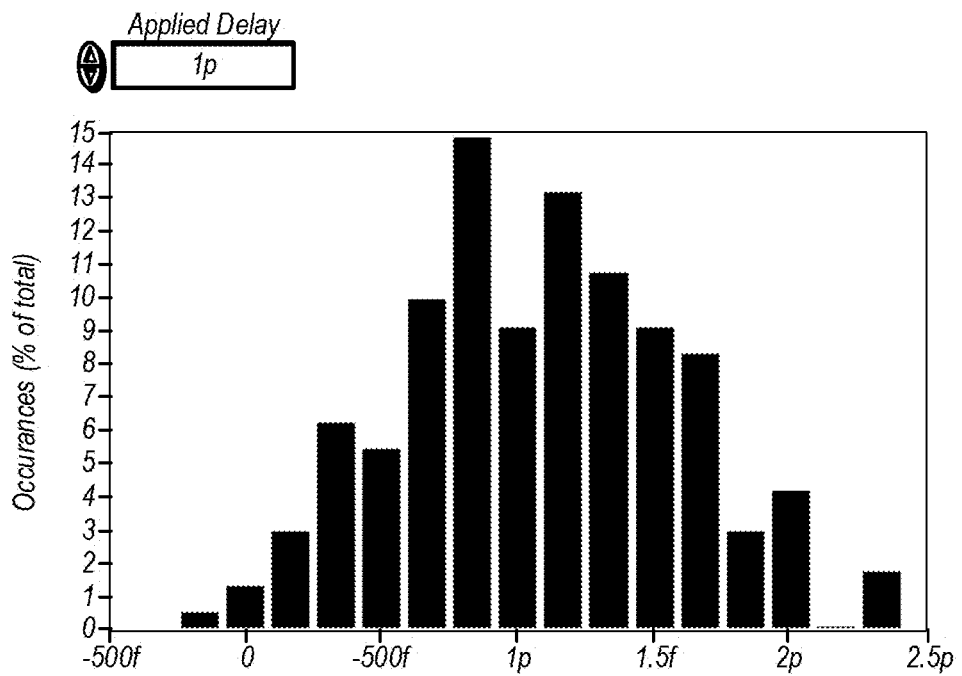
Figure 17C:
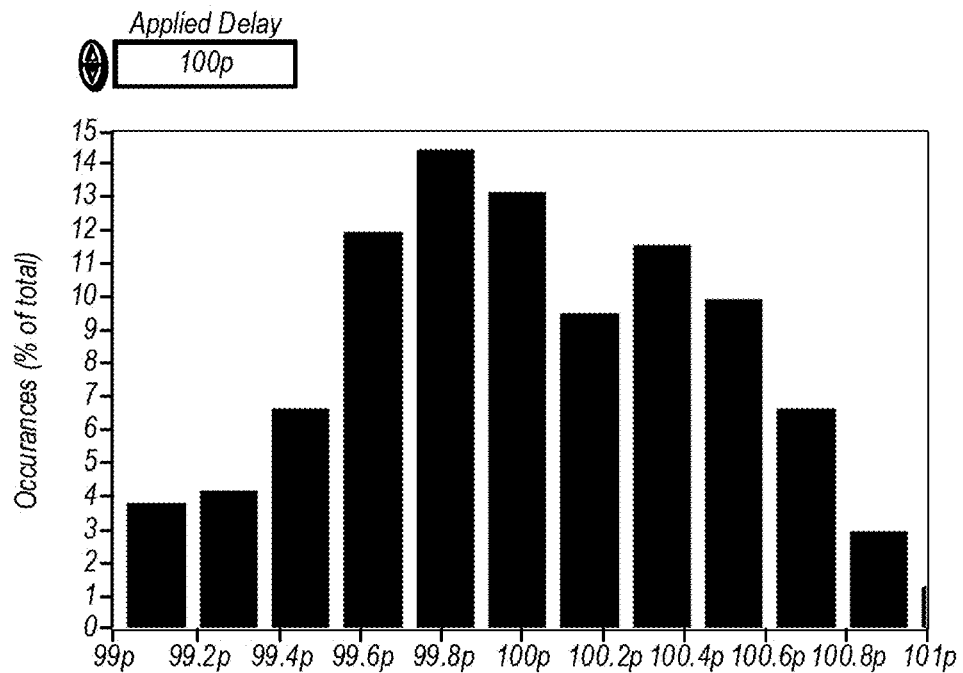
Figure 17D:
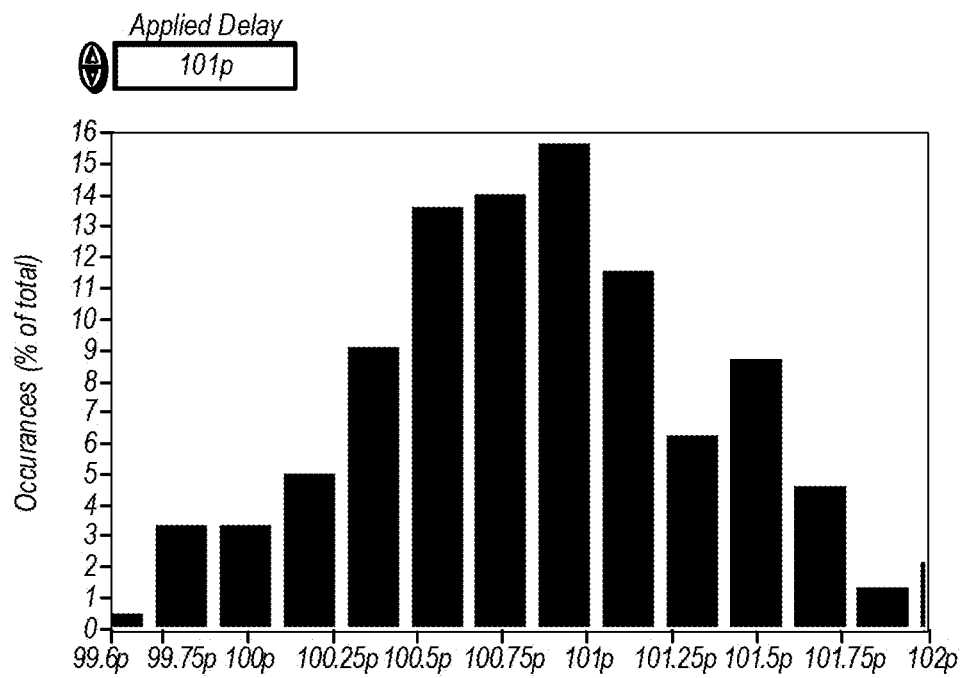
Figure 17E:
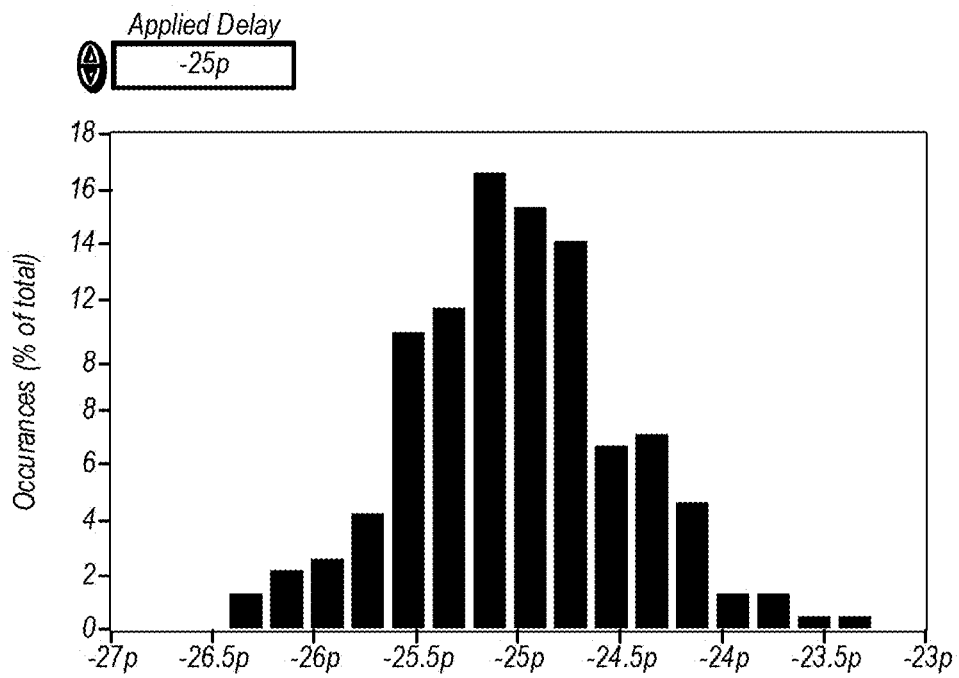
Figure 17F:
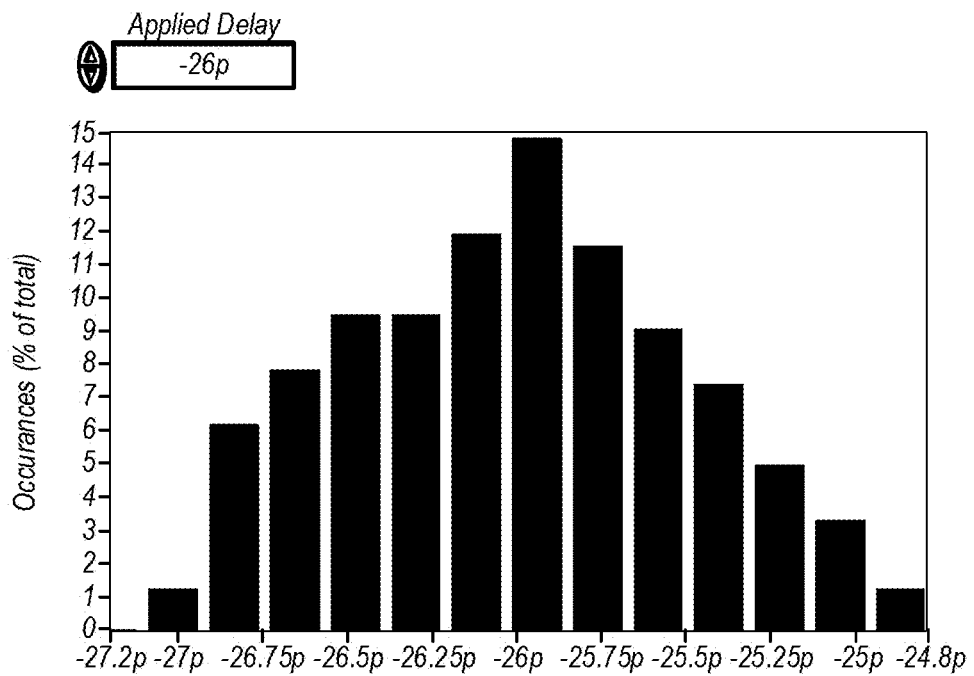

FIG. 16—Implementation using NI mmWave Transceiver System Hardware

FIG. 16 is a screenshot showing the measurement of the sub-sample delays as measured according to embodiments described herein on 4 parallel receivers of the NI mmWave Transceiver system (NI MTS) hardware at 28 GHz. The illustrated data was obtained using the NI Channel Sounder reference architecture running on the NI MTS. As illustrated, sub-sample measurements down to picoseconds have been successfully measured with the hardware and software combination. This has been tested in both SISO and SIMO configurations. The lower array has a sub-sample measurement of the time delay in propagation that has been converted to units of time in seconds. The field "Max Misalignment" reports the difference in seconds for the propagation between the 2 channels that have the measured highest and lowest sub-sample offsets. As illustrated, the max residual misalignment between any 2 channels is measured to be 884 femtoseconds.

FIGS. 17 A-F NI PXIe-5644 Implementation

FIGS. 17 A-F are screenshots illustrating the results of implementing embodiments described herein on a PXIe-5644 architecture, to measure the sub-sample offset delays in parallel vector signal transceivers (VSTs). The sub-sample offset delays are then used to align multiple VSTs. FIGS. 17 A-F illustrate the result of measuring various applied delays between two PXIe-5644 channels running at 100 Msps. As illustrated, even with the samples being 10 nanoseconds apart, single picosecond delay differences are distinguishable between the received signals.

Figure 18:
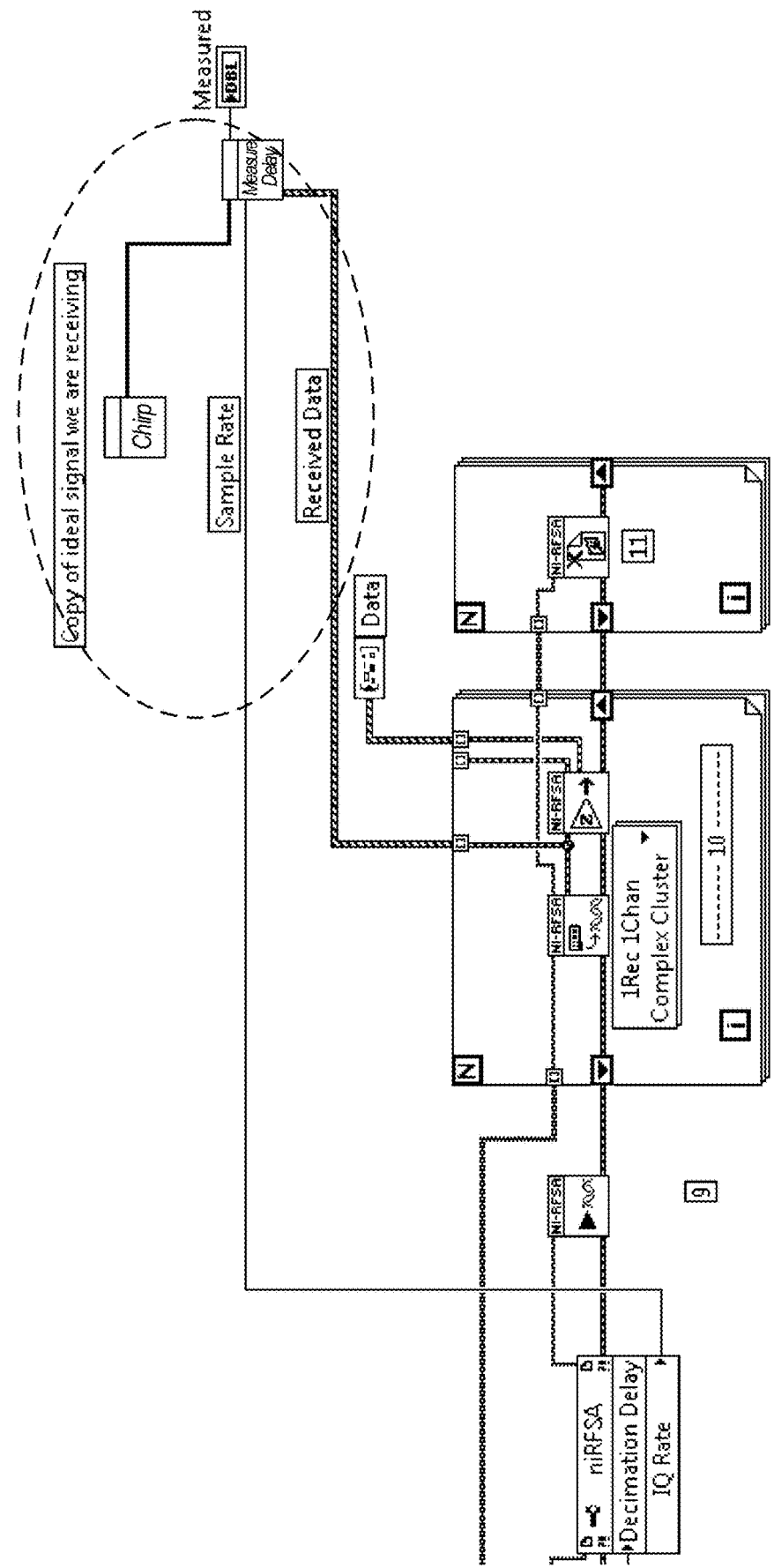
FIG. 18 is a graphical representation of code used for performing calibration measurements, according to some embodiments.

FIG. 18—Code for NI PXIe-5644 Implementation

FIG. 18 is a graphical representation of code used for the NI PXIe-5644—implementation illustrated in FIGS. 17 A-F. FIG. 18 illustrates that the described embodiments are independent from the underlying hardware used in implementation. To accomplish the described embodiments, a processor may simply be sent the signals expected and received, without any special support or features from hardware.

The embodiments described herein can be used in many synchronization applications, not necessarily limited to MIMO radios. For example, in test applications for newer cellular and WLAN standards that use MIMO, higher timing alignment in the testers would improve measurement performance. These embodiments work along with TClk™ to give picosecond timing alignment, as well as phase alignment.

Embodiments described herein may solve a critical technical problem using channel sounders. In the field of channel sounding, these techniques permit Angle of Arrival algorithms to work for channel sounding operations. Some embodiments enable flight time measurements of multipath components down to the sub-sample level. Flight time corresponds to flight distance, so that, for example, a measured sampling time of 0.66 ns corresponds to a flight distance resolution of 20 cm. By measuring the flight time with sub-sample accuracy, the flight time may be measured with picosecond resolution, which translates to determining centimeter distance resolution. Some embodiments may be advantageous in radio direction finding applications, since phase and time aligning multiple receivers is critical to running direction finding algorithms in these applications. Embodiments herein may additionally enable radar distance measurement with centimeter resolution in addition to channel sounding with the same sounder platform.

Shared Start Trigger

In some embodiments, an acquisition ADC start trigger may be shared between each receiver during alignment measurements. The start acquisition trigger may preserve the timing alignment between each receiver. For example, the N receivers may be time and phase aligned if the N ADCs all start the alignment process based on a shared trigger. Although the trigger is there to start the acquisition, there is likely to be several nanoseconds of residual timing misalignment between one ADC and another—hence the equalizer derived may remove this timing mismatch and also phase align the receivers. After switching to an operational mode, the timing and phase alignment functions of the programmable delay previously derived may hold if all the N receivers' ADCs are initiated for acquisition together via the shared trigger.

Real-Time Calibration Scheduling

In some embodiments, the data communication protocol used by the radios may be designed to automatically repeat the alignment process at pre-set intervals to improve MIMO performance. The radio protocol may be designed to have pre-scheduled gaps in data transmission such that the receivers can go from an operational mode to an alignment mode, perform alignment, and switch back to an operational mode. In a packeted data transmission radio protocol using this invention, there may be time slots for alignment where data packets are not sent, but where real-time alignment of the receivers is performed. As a result, the MIMO radio system may be configured to perform alignment in real-time without missing data packets from the antennas during the alignment procedures.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for time-aligning a plurality of receivers in a multiple input multiple output (MIMO) communication system, the method comprising:
for each of the plurality of receivers:
receiving a first wideband pilot signal from a signal generator through a respective system channel;
determining a respective first rate of change of a phase shift as a function of frequency of the received first wideband pilot signal; and
determining a respective first time delay associated with the received first wideband pilot signal based on the respective first rate of change; and
employing a programmable delay based on the first time delays to reduce a timing misalignment between the plurality of receivers.

2. The method of claim 1,
wherein the first time delays are-determined to sub-sample precision.

3. The method of claim 1, further comprising:
subsequent to employing the programmable delay:
communicatively coupling a plurality of generators to respective ones of the plurality of receivers;
transmitting, by each of the plurality of generators, a second wideband pilot signal to its respective receiver;
for each of the plurality of receivers:
receiving the respective second wideband pilot signal;
determining a respective second rate of change of a phase shift as a function of frequency of the received second wideband pilot signal; and
determining a respective second time delay associated with the received second wideband pilot signal based on the respective second rate of change; and
adjusting the programmable delay based on the second time delays to reduce a timing misalignment between the plurality of generators.

4. The method of claim 1, further comprising:
prior to receiving the first wideband pilot signals, calibrating the system channels by:
for each of the respective system channels:
connecting the signal generator to a first receiver of the plurality of receivers using the respective system channel;
transmitting a second wideband pilot signal from the signal generator to the first receiver through the respective system channel;
receiving, by the first receiver, the second wideband pilot signal;
determining a respective second rate of change of a phase shift as a function of frequency of the received second wideband pilot signal; and
determining a respective second time delay associated with the respective system channel based on the respective second rate of change; and
reducing a timing misalignment in a subsequent MIMO communication session using the system channels based on the second time delays.

5. The method of claim 4,
wherein said receiving the first wideband pilot signal by each of the plurality of receivers employs a programmable delay based on the second time delays to reduce a timing misalignment caused by differences between the system channels.

6. The method of claim 4,
wherein each of the system channels comprises a switch that is usable to switch the respective system channel between a wired connection and a wireless connection, and
wherein said calibrating the system channels is performed while the system channels are switched to the wired connection.

7. The method of claim 1,
wherein each of the plurality of receivers share a local oscillator (LO).

8. The method of claim 1,
wherein, in determining the first rates of change of the phase shift:
a fast Fourier transform (FFT) is applied to the received first wideband pilot signal to obtain a first FFT signal;
the FFT is applied to a reference wideband pilot signal to obtain a reference FFT signal; and
phase information of the first FFT signal is subtracted from phase information of the reference FFT signal to obtain phase shift information, wherein the first rates of change of the phase shift are determined based on the phase shift information.

9. The method of claim 8,
wherein the first rates of change of the phase shift are determined further based on averaging over phase shift information associated with a plurality of different frequency bins of the FFT.

10. The method of claim 8,
wherein, in determining the first rates of change of the phase shift based on the phase shift information, a least squares regression linear fit is applied to the phase shift information across FFT frequency bins to obtain the first rates of change, and
wherein the application of the least squares regression linear fit also determines a phase offset at 0 Hz between local oscillators of the signal generator and receivers.

11. The method of claim 8,
wherein a frequency selective method is used to determine frequency bins of the FFT with the best signal to noise ratio and signal quality for use in the estimation of the first rates of change.

12. The method of claim 1,
wherein the first wideband pilot signal comprises at least one of:
    a time-domain sync impulse;
    a Zadoff-Chu sequence;
    a multi-sine signal; and
    a frequency chirped wideband signal.

13. A multiple-input multiple-output (MIMO) radio system comprising a plurality of receivers and signal generators coupled to one or more processors, wherein the MIMO radio system is configured to:
    for each of the plurality of receivers:
        receive, by a receiver of the plurality of receivers, a first wideband pilot signal from a signal generator of the plurality of signal generators through a respective system channel;
        determine, by the one or more processors, a respective first rate of change of a phase shift as a function of frequency of the received first wideband pilot signal; and
        determine, by the one or more processors, a respective first time delay associated with the received first wideband pilot signal based on the first rate of change; and
    wherein the one or more processors are configured to:
        employ a programmable delay based on the first time delays to reduce a timing misalignment between the plurality of receivers.

14. The MIMO radio system of claim 13, wherein the MIMO radio system is further configured to:
    subsequent to employing the programmable delay:
        transmit, by each of the plurality of signal generators, a second wideband pilot signal to a respective receiver;
        for each of the plurality of receivers:
            receive, by a receiver of the plurality of receivers, the second wideband pilot signal;
            determine, by the one or more processors, a respective second rate of change of a phase shift as a function of frequency of the received second wideband pilot signal; and
            determine, by the one or more processors, a respective second time delay associated with the received second wideband pilot signal based on the respective second rate of change; and
    wherein the one or more processors are further configured to:
        adjust the programmable delay based on the second time delays to reduce a timing misalignment between ones of the plurality of signal generators.

15. The MIMO radio system of claim 13, wherein the MIMO radio system is further configured to:
    prior to receiving the first wideband pilot signals,
    for each of the respective system channels:
        connect, by the one or more processors and using the respective system channel, a first signal generator of the plurality of signal generators to a first receiver of the plurality of receivers;
        transmit, by the first signal generator, a second wideband pilot signal to the first receiver through the respective system channel;
        receive, by the first receiver, the second wideband pilot signal;
        determine, by the one or more processors, a respective second rate of change of a phase shift as a function of frequency of the received second wideband pilot signal; and
        determine, by the one or more processors, a respective second time delay associated with the respective system channel based on the respective second rate of change; and
    wherein the one or more processors are further configured to:
        reduce a timing misalignment in a subsequent multiple-input multiple-output (MIMO) communication session using the system channels based on the second time delays.

16. The MIMO radio system of claim 13,
wherein the first wideband pilot signal comprises at least one of:
    a time-domain sync impulse;
    a Zadoff-Chu sequence;
    a multi-sine signal; and
    a frequency chirped wideband signal.

17. A non-transitory computer-readable memory medium comprising program instructions executable by a processor of a multiple-input multiple-output (MIMO) communication system to cause the MIMO communication system to:
    for each of a plurality of receivers in the MIMO communication system:
        receive a first wideband pilot signal from a signal generator through a respective system channel;
        determine a respective first rate of change of a phase shift as a function of frequency of the received first wideband pilot signal; and
        determine a respective first time delay associated with the received first wideband pilot signal based on the respective first rate of change; and
    employ a programmable delay based on the first time delays to reduce a timing misalignment between the plurality of receivers.

18. The non-transitory computer-readable memory medium of claim 17,
wherein the first time delays are determined to sub-sample precision.

19. The non-transitory computer-readable memory medium of claim 17, wherein the program instructions are further executable to cause the MIMO communication system to:
    subsequent to employing the programmable delay:
        transmit, by each of a plurality of signal generators of the MIMO communication system, a second wideband pilot signal to a respective receiver of the plurality of receivers;

for each of the plurality of receivers:
  receive the second wideband pilot signal;
  determine a respective second rate of change of a phase shift as a function of frequency of the received second wideband pilot signal; and
  determine a respective second time delay associated with the received second wideband pilot signal based on the respective second rate of change; and
adjust the programmable delay based on the second time delays to reduce a timing misalignment between ones of the plurality of signal generators.

20. The non-transitory computer-readable memory medium of claim 17, wherein the program instructions are further executable to cause the MIMO communication system to:
prior to receiving the first wideband pilot signals,
  for each of the system channels:
    connect the signal generator to a first receiver of the plurality of receivers using the respective system channel;
    transmit a second wideband pilot signal from the signal generator to the first receiver through the respective system channel;
    receive, by the first receiver, the second wideband pilot signal;
    determine a respective second rate of change of a phase shift as a function of frequency of the received second wideband pilot signal; and
    determine a respective second time delay associated with the respective system channel based on the respective second rate of change; and
wherein said receiving the first wideband pilot signal by each of the plurality of receivers employs a programmable delay based on the second time delays to reduce a timing misalignment caused by differences between the system channels.

* * * * *